United States Patent
Sugiyama et al.

[11] Patent Number: 6,113,187
[45] Date of Patent: Sep. 5, 2000

[54] FOLDING SEAT FOR VEHICLE

[75] Inventors: Toshihiro Sugiyama, Anjo; Nobuyuki Naraki, Kariya; Hideki Shimizu, Toyota; Kazuo Sato, Anjo, all of Japan

[73] Assignee: Toyota Shatai Kabushiki Kaisha, Kariya, Japan

[21] Appl. No.: 09/177,914

[22] Filed: Oct. 23, 1998

[30] Foreign Application Priority Data

| Oct. 23, 1997 | [JP] | Japan | 9-309756 |
| Oct. 23, 1997 | [JP] | Japan | 9-309757 |
| Aug. 19, 1998 | [JP] | Japan | 10-250413 |
| Aug. 19, 1998 | [JP] | Japan | 10-250414 |
| Aug. 19, 1998 | [JP] | Japan | 10-250415 |
| Sep. 28, 1998 | [JP] | Japan | 10-272672 |

[51] Int. Cl.$^7$ .................................................. B60N 2/32
[52] U.S. Cl. ...................... 297/335; 297/15; 297/378.12; 296/65.09
[58] Field of Search ............................. 297/15, 335, 336, 297/378.12; 296/65.05, 65.09, 65.13

[56] References Cited

U.S. PATENT DOCUMENTS

| 5,954,398 | 9/1999 | Namba et al. | 297/378.12 X |
| 5,971,466 | 10/1999 | Hashimoto | 296/65.05 X |

FOREIGN PATENT DOCUMENTS

| 0 780 261 A2 | 6/1997 | European Pat. Off. . |
| 2 577 860 | 8/1986 | France . |
| 2449552 | 9/1990 | France | 297/378.12 |
| 2 691 681 | 12/1993 | France . |
| 2 696 386 | 4/1994 | France . |
| U-60-148134 | 10/1985 | Japan . |
| U-60-161629 | 10/1985 | Japan . |
| 360244634 | 12/1985 | Japan | 296/65.09 |
| 75027 | 4/1986 | Japan | 297/335 |
| U-3-47825 | 5/1991 | Japan . |
| U-3-52241 | 5/1991 | Japan . |
| U-6-9890 | 3/1994 | Japan . |
| 8-119016 | 5/1996 | Japan . |
| 10-35334 | 2/1998 | Japan . |
| 10-95257 | 4/1998 | Japan . |

*Primary Examiner*—Peter R. Brown
*Attorney, Agent, or Firm*—Pillsbury Madison & Sutro, LLP

[57] ABSTRACT

An upper rail is slidably provided on a lower rail fixed to a floor of a vehicle body. The front end of a seat cushion is connected with the front end of the upper rail such that the seat cushion is pivotal forwardly for inversion. The lower end of a seat back is connected with the rear end of the upper rail through a reclining mechanism such that the seat back is tiltable. The seat back is tilted pivotally forwardly into the space from which the seat cushion has been pivotally moved for inversion. A baggage-placing surface is formed of a bottom plate of the inverted seat cushion and a rear plate of the seat back tilted pivotally forwardly.

13 Claims, 30 Drawing Sheets

FOLDING SEAT FOR VEHICLE

BACKGROUND OF THE INVENTION

1. Field of the Invention

In general, the present invention relates to a folding seat for a vehicle. More particularly, the present invention relates to improvement of the construction thereof.

2. Description of Related Art

In vehicles such as vans, a folding seat is used to accommodate a large amount of baggage and long baggage by utilizing the interior thereof. In the folding seat of this kind disclosed in Laid-Open Japanese Utility Model Publication No. 60-148134, a seat cushion is pivoted forward to invert it at a predetermined position and a seat back is tilted pivotally forwardly to the space from which the seat cushion has been pivoted forward to secure a wide baggage-placing surface consisting of the bottom surface of the seat cushion and the rear surface of the seat back.

However, the above-described folding seat for a vehicle is locked in its lengthwise movement. Let it be supposed that the folding seat for a vehicle is used as the rear seat. In this case, when the front seat moves forward, the rear seat cannot be moved according to the movement of the front seat. Thus, the interior of a vehicle is not effectively utilized.

SUMMARY OF THE INVENTION

The present invention has been made to solve such a problem. Thus, it is an object of the present invention to provide a folding seat for a vehicle which can be moved back and forth on the floor of the vehicle to utilize the interior of the body of the vehicle effectively.

In order to achieve this object, there is provided a folding seat for a vehicle comprising a movable member provided on a floor of a vehicle such that the movable member is movable lengthwise over the floor; a seat cushion which is provided on the movable member and whose front end of the seat cushion is connected with one end of the movable member by means of a shaft member such that the seat cushion is pivotal on the shaft member to invert the seat cushion at a predetermined forward position; and a seat back whose lower end is pivotally connected with the other end of the movable member and which is pivotally tilted forward to a space from which the seat cushion has been pivoted for inversion. In this construction, a baggage-placing surface having an approximately a uniform height and consisting of a bottom surface of the inverted seat cushion and a rear surface of the seat back tilted pivotally forwardly is formed.

According to the present invention, a wide baggage-placing surface is secured owing a pivotal motion of the seat cushion and forward tilting of the seat back. The wide baggage-placing surface can be used as a baggage-placing space. The seat cushion and the seat back are installed on the movable member mounted on the floor of the vehicle such that it is movable lengthwise. Thus, the seat cushion and the seat back are capable of freely moving back and forth on the floor. Thus, the interior of the vehicle can be effectively utilized.

BRIEF DESCRIPTION OF THE DRAWINGS

FIG. 9 is an enlarged perspective view showing an upper end portion of a bracket according to the fifth embodiment of the present invention.

DETAILED DESCRIPTION OF THE INVENTION

Figure 1:
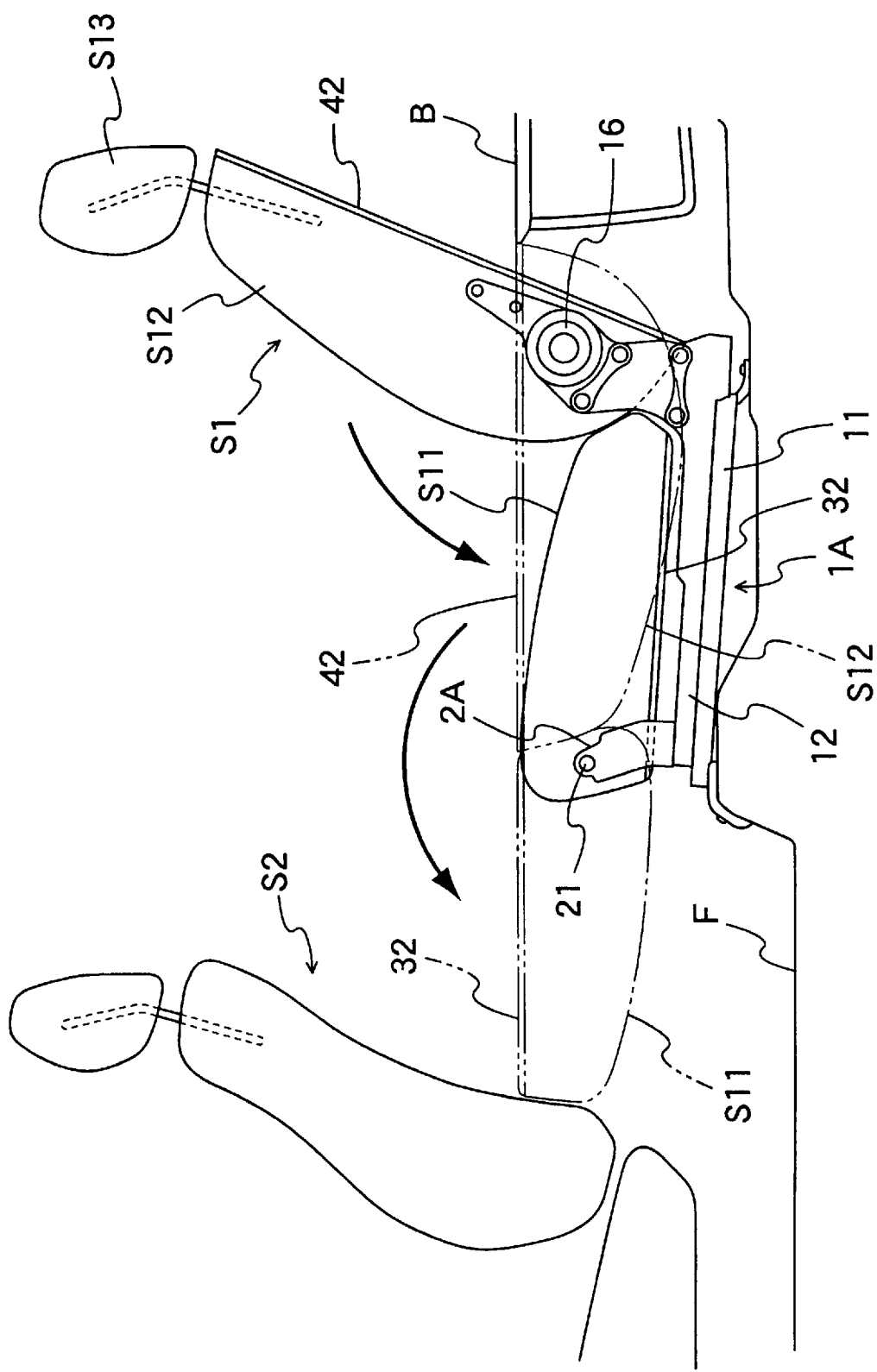
FIG. 1 is a schematic side view entirely showing a rear seat according to a first preferred embodiment of the present invention.

In a first aspect of the present invention, a folding seat for a vehicle comprising a movable member 12 is provided on a floor (F) of a vehicle so that the movable member 12 is movable lengthwise over the floor (F); a seat cushion S11 is provided on the movable member 12 and has a front end is connected with one end of the movable member 12 by means of a shaft member 21 so that the seat cushion S11 is pivotal on the shaft member 21 to invert the seat cushion S11 at a predetermined forward position; and a seat back S12 whose lower end is pivotally connected with the other end of the movable member 12 and which is pivotally tilted forward to a space from which the seat cushion S11 has been pivoted for inversion. In this construction, a baggage-placing surface having approximately a uniform height and consisting of a bottom surface of the inverted seat cushion S11 and a rear surface of the seat back S12 tilted pivotally forwardly is formed.

According to the first aspect of the present invention, a wide baggage-placing surface is secured owing a pivotal motion of the seat cushion and forward tilting of the seat back. The wide baggage-placing surface can be used as a baggage-placing space. The seat cushion and the seat back are installed on the movable member mounted on the floor of the vehicle such that it is movable lengthwise. Thus, the seat cushion and the seat back are capable of freely moving back and forth on the floor. Thus, the interior of the vehicle can be effectively utilized.

When two movable members are provided along the right and left side edges of the folding seat, it is preferable to provide connection members 14 and 18 connecting both movable members 12 with each other to prevent both movable members 12 from being dislocated from each other in the sliding direction. Thus, the seat cushion S11 and the seat back S12 are prevented from being twisted.

In a second aspect of the present invention, the shaft member 121 is supported by a bracket 102 provided on the movable member 112, and the bracket 102 is provided with a stopper 127 to position the seat cushion S11 such that a bottom surface 132 of the seat cushion S11 forms a baggage-placing surface by contact of a part 143 of the seat cushion S11 with the stopper 127 when the seat cushion S11 is pivoted for inversion.

In the second aspect of the present invention, the stopper is installed on the bracket connected with the front end of the seat cushion such that the seat cushion is rotatable. Thus, person's legs seated on the seat cushion do not interfere with the stopper. Further, because the bracket on which the stopper is installed is mounted on the movable member, the stopper operation is displayed irrespective of a position of the folding seat.

In a third aspect of the present invention, the stopper 127 is a cylindrical member formed on the bracket 102 and extending vertically, and an upper end surface of the cylindrical member serves as a stopper surface 128 which contacts a part 143 of the seat cushion S11.

In the third aspect of the present invention, the cylindrical member formed on the bracket serves as the stopper and the upper end surface thereof serves as the stopper surface. Thus, it is possible to supportingly position the seat cushion without deforming the stopper when a great load is applied thereto.

In a fourth aspect of the present invention, the stopper 524 is provided on the bracket 502 such that a vertical position of the stopper 524 is adjustable.

In the fourth aspect of the present invention, it is possible to adjust the height of the front end of the inverted seat cushion to be constant irrespective of installation errors or deformation of parts by appropriately vertically moving the stopper.

In a fifth aspect of the present invention, supporting members 633, 733, 833 for supporting a front end of the inverted seat cushion 632, 732 and 832 are provided.

In the fifth aspect of the present invention, the supporting member keeps the height of the front end of the inverted seat cushion constant and reliably keeps the seat cushion horizontal without the seat cushion being shifted downward when a comparatively great load is applied thereto.

In a sixth aspect of the present invention, the shaft member 921 is movable lengthwise along the movable member 912 within a predetermined range.

In the sixth aspect of the present invention, when the shaft member is moved forward, a length-increased space is formed in the space from which the seat cushion has been pivoted forward for inversion. A sufficiently long seat back can be tilted forward into the space.

In a seventh aspect of the present invention, a bridging plate 1172 whose lower end is pivotally connected with a rear surface of the seat back S12 is provided on the rear surface such that the bridging plate 1172 is pivoted rearward when the seat back S12 is tilted pivotally forwardly to place the bridging plate 1172 on a front edge of a stepped rear half part (B) of the floor (F) as high as the baggage-placing surface.

In the seventh aspect of the present invention, a sufficiently long continuous surface consisting of the upper surface of the rear half part of the floor of the vehicle, the bridging plate, the rear surface of the seat back and the bottom surface of the seat cushion is formed by pivoting the bridging plate rearward and placing the front end of the bridging plate on the front edge of the rear half part of the floor of the vehicle. Thus, the interior of the vehicle can be effectively utilized.

In a eighth aspect of the present invention, an extended portion 262 is formed by extending a part of the rear surface 261 of the seat back S12 in a seat back-extended direction by a predetermined length from a lower edge of the seat back S12 such that when the seat back S12 is pivotally forwardly tilted, the extended portion 262 extends to a front edge of a stepped rear half part (B) of the floor (F) as high as the baggage-placing surface, thus contacting the front edge and filling a gap (d) between the front edge and the lower edge of the seat back S12. As a part of the rear surface of the seat back, carpet cloth attached to the surface of the seat back is exemplified.

In the eighth aspect of the present invention, because the extended portion fills the gap between the front edge and the lower edge of the seat back, it is possible to prevent the folding seat from looking unattractive. Further, because a part of the rear surface of the seat back is extended in a seat back-extended direction, it is not necessary to install a separate member on the rear surface of the seat back. Thus, it is possible to prevent generation of the gap simply and inexpensively.

In a ninth aspect of the present invention, a baggage-accommodating tray 304 covering the movable member 312 is provided in a space below the uninverted seat cushion S11.

In the ninth aspect of the present invention, when the seat cushion moves pivotally from the movable member, the baggage-accommodating tray covers the movable member. Thus, the movable member is not exposed. Further, the baggage-accommodating tray can accommodate various kinds of packages, with the seat cushion being inverted. Thus, it is not necessary to use an increased number of component parts. That is, it is possible to prevent the manufacturing cost from becoming costly.

In tenth aspect of the present invention, a vertical position of a bracket 402 rotatably supporting a front end portion of the seat cushion S11 is adjustable within a predetermined range before the seat cushion S11 is placed in position. As an example of the construction for adjusting the vertical position of the bracket, the inner diameter of a bracket-installing opening of the bracket is set to be greater than the outer diameter of the screwing portion of an installing bolt.

In the tenth aspect of the present invention, the vertical position of the bracket rotatably supporting the front end portion of the seat cushion is adjustable within a predetermined range. Therefore, the height of the rear edge of the bottom surface of the inverted seat cushion can be allowed to be coincident with the height of the front edge of the rear surface of the seat back tilted pivotally forwardly by adjusting the height of the bracket. Thus, it is possible to reliably prevent the height of the rear edge of the bottom surface of the inverted seat cushion from becoming different from the height of the front edge of the rear surface of the seat back tilted pivotally forwardly. Accordingly, it is possible to prevent the baggage-placing surface of the seat cushion and that of the seat back from becoming different from each other.

In a eleventh aspect of the present invention, a seat system for a vehicle in which a tilt-down seat S4 is positioned adjacently to a folding seat S3 for a vehicle according to the above-described first through tenth aspects of the invention and moves downward to a floor (F) in association with a forward pivotal motion of a seat back S42 thereof to form a baggage-placing surface having approximately a uniform height and consisting of a bottom surface of an inverted seat cushion S31 of the folding seat S3 for a vehicle, a rear surface of a seat back S32 of the folding seat S3 for a vehicle tilted pivotally forwardly, and a rear surface of the seat back S42 of the tilt-down seat S4 tilted pivotally forwardly.

In the eleventh aspect of the present invention, a baggage-placing surface consisting of the surfaces having the same height, namely, the bottom surface of the folding seat S3 for a vehicle, the rear surface thereof, and the rear surface of the seat back of the tilt-down seat is formed. Thus, the interior of the body of the vehicle can be effectively utilized.

First Embodiment

FIG. 1 is a schematic side view showing the folding seat of the present invention applied to a rear seat of a van. Referring to FIG. 1, a rear seat S1 is positioned rearward from a front seat S2 and placed on a slide rail 1A (one of two is shown) installed on a floor (F). The slide rails 1A and 1B (see FIG. 2) extend in parallel with each other along the floor (F) in the lengthwise direction of the body of the van, thus comprising a pair of lower rails 11 and a pair of upper rails 12 serving as a movable member sliding along the lower rails 11.

Figure 2:
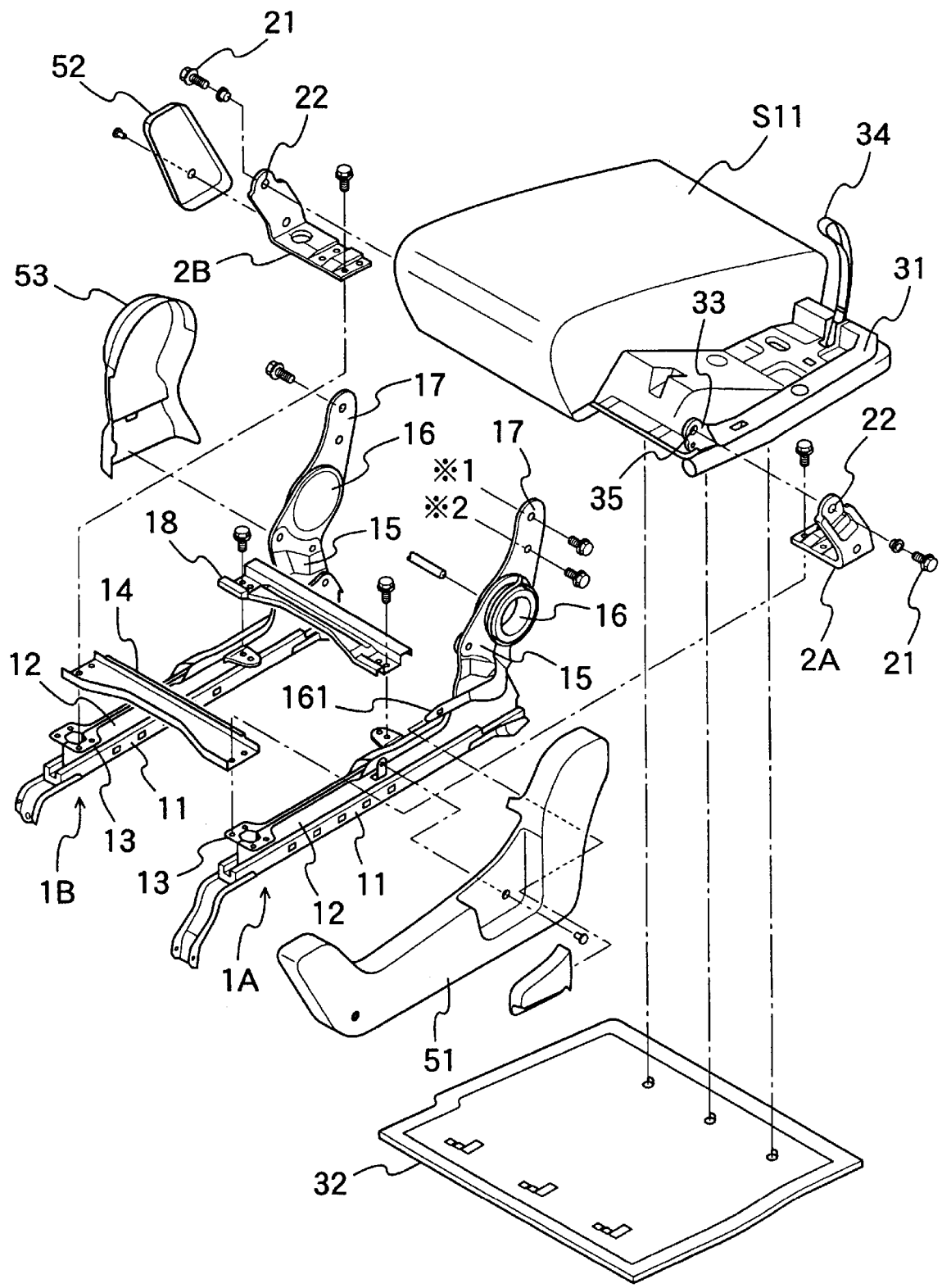
FIG. 2 is an exploded perspective view showing a seat cushion of the rear seat according to the first embodiment of the present invention.

Referring to FIG. 2, an installing portion 13 is formed on the front end of each of the right and left upper rails 12. One end of a connection member 14 connecting the right and left upper rails 12 with each other and a bracket 2A or 2B are fixed to each installing portion 13 with screws. The brackets 2A and 2B are both bent in an "L" shape. Each of the brackets 2A and 2B has a through hole 21 through which a shaft member 22 is inserted. The shaft member 21 is positioned at the upper end of the erected part of each of the brackets 2A and 2B.

A frame plate 31 is installed in the lower part of a seat cushion S11 of the rear seat S1. A bottom plate 32 made of a hard board is installed on the frame plate 31. A stay 33 is installed on each of the right and left front ends of the frame plate 31. One of the two stays 33 is shown in FIG. 2. The stay 33 is rotatably connected with the bracket 2A or 2B by means of the shaft member 22 inserted through the through hole 21 and a through hole 35 formed at the upper end of the stay 33, with the through holes 21 and 35 positioned coaxially with each other. This construction allows the rear end of the seat cushion S11 to be lifted and the seat cushion S11 to be pivoted forward or counterclockwise (hereinafter referred to as "forward") on the line (axis) connecting the right and left shaft members 22 with each other. That is, the construction allows the seat cushion S11 to be inverted at a predetermined forward position, as shown by the arrow of FIG. 1. The inverted seat cushion S11 (shown by the two-dot chain line of FIG. 1) is held by a stopper not shown in FIGS. 1 and 2 such that the bottom plate 32 is horizontal. A pulling band 34 for pulling the seat cushion S11 upward is installed on the rear end of the frame plate 31, as shown in FIG. 2.

Figure 3:
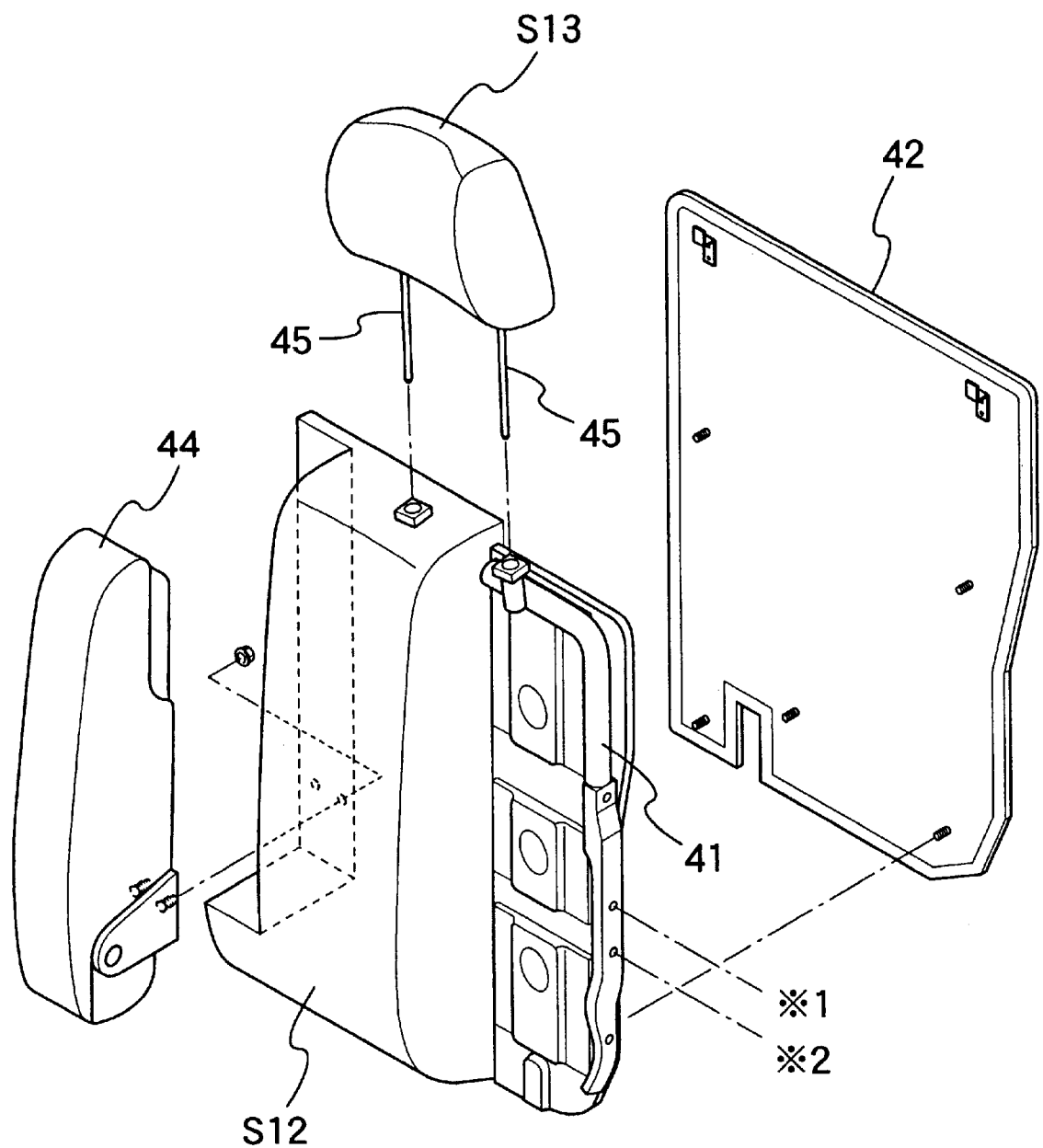
FIG. 3 is an exploded perspective view showing a seat back of the rear seat according to the first embodiment of the present invention.

A bracket plate 15 extending upward is connected with the rear end of each of the right and left upper rails 12. The lower end of a stay 17 screwed into a frame pipe 41 (see FIG. 3) of a seat back S12 is connected with each of the bracket plates 15 via a reclining mechanism 16 having a known construction. A rear plate 42 made of a hard board is installed on the rear surface of the seat back S12. A head rest S13 is installed on the upper surface of the seat back S12 with two supporting legs 45 thereof. An arm rest 44 is installed on a concave portion of the seat back S12 at a lateral side thereof.

The upper rail 12 of the slide rail 1A and that of the slide rail 1B (see FIG. 2) are connected with each other with a connection member 18 at an intermediate position thereof. A protection cover 51 is installed on the upper rail 12 of the slide rail 1A to cover it and members attached thereto. More specifically, the protection cover 51 extends in the range from the bracket 2A positioned over the front end of the upper rail 12 to the reclining mechanism 16 positioned over the rear end thereof. Similarly, protection covers 52 and 53 are installed on the upper rail 12 of the slide rail 1B to cover it and members attached thereto. More specifically, the protection covers 52 and 53 cover the bracket 2B positioned over the front end of the upper rail 12 and the reclining mechanism 16 positioned over the rear end thereof, respectively.

In order to form a full flat baggage-placing surface widely in the interior of the van body by folding the rear seat S1, the pulling band 34 installed on the rear end of the seat cushion S11 is gripped and pulled upward. As a result, the rear end of the seat cushion S11 is elastically deformed and brought out of contact with the lower end of the seat back S12. Consequently, the seat cushion S11 is pivoted forward on the line connecting the right and left shaft members 21 with each other and inverted at a predetermined forward position, as shown by the arrow of FIG. 1. Then, the head rest S13 is removed from the upper end of the seat back S12. Then, an operation lever 161 of the reclining mechanism 16 is operated to pivotally tilt the seat back S12 forward (see the arrow and the two-dot chain line of FIG. 1) to form a horizontal continuous surface consisting of the bottom plate 32 of the inverted seat cushion S11 and the rear plate 42 of the seat back S12 tilted pivotally forward. In this manner, it is possible to form the wide flat baggage-placing surface which is substantially on a level with the upper surface of a luggage box (B) provided in the rear part of the interior of the van body. It is possible to place a large amount of baggage and long baggage on the flat baggage-placing surface. In the first embodiment, because the rear seat S1 can be allowed to be flat over the slide rails 1A and 1B, baggage can be appropriately placed on the baggage-placing surface by moving the flattened rear seat S1 according to a lengthwise set position of the front seat S2.

Further, the right and left upper rails 12 are connected with each other, with the connection members 14 fixed thereto at the front position thereof and with the connection member 18 fixed thereto at the intermediate positions thereof. Therefore, it is possible to prevent the right and left upper rails 12 from being dislocated from each other in the sliding direction thereof. Thus, the seat cushion S11 and the seat back S12 can be prevented from being twisted.

In the first embodiment, the present invention is applied to the rear seat. But it is also possible to apply it to the front seat. In this case, the interior of the van body can be effectively utilized by appropriately adjusting the position of the fully flattened front and rear seats in the lengthwise direction of the van body. The slide rail is not necessarily installed on the floor of the van body in the lengthwise direction thereof.

Second Embodiment

Figure 4:
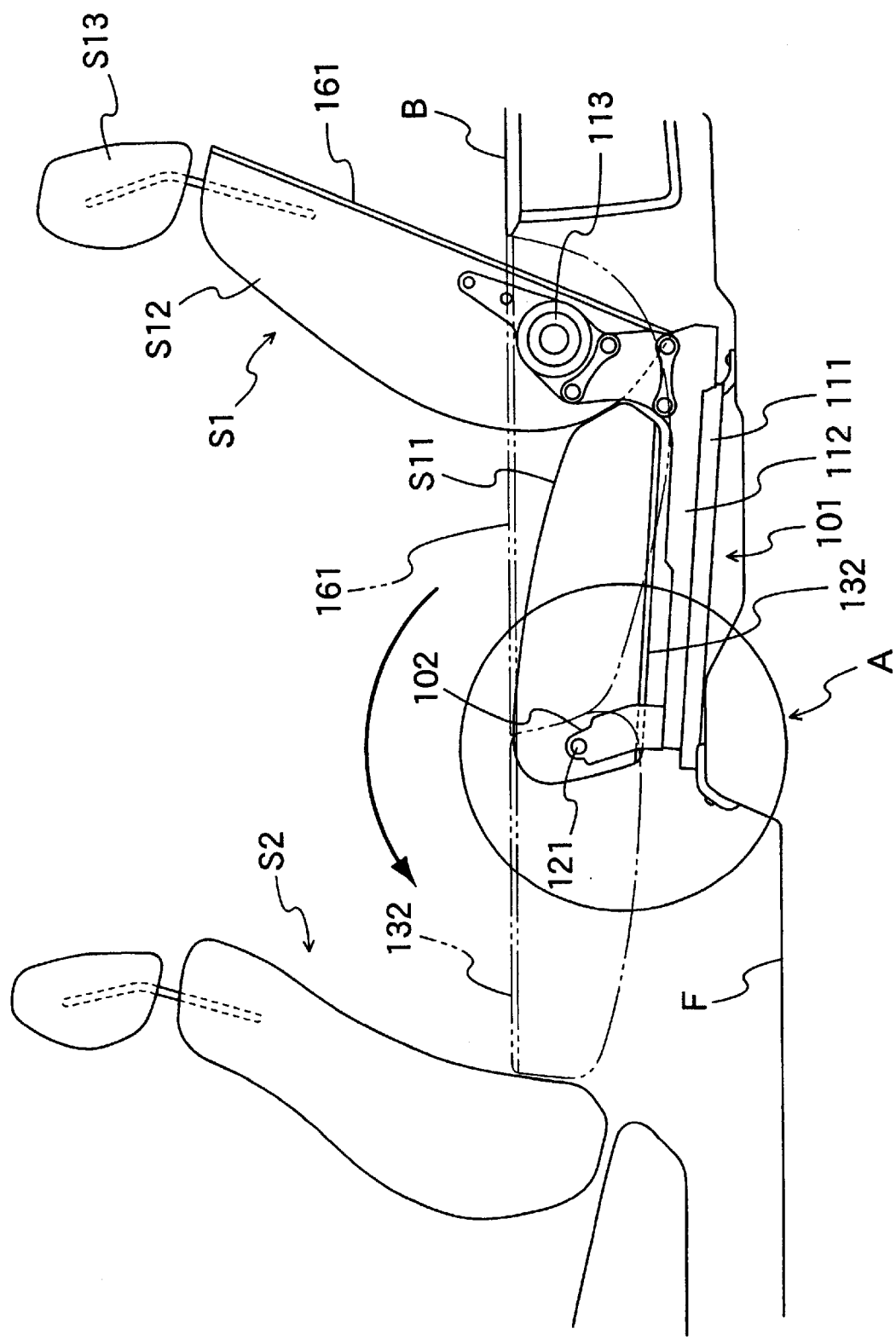
FIG. 4 is a schematic side view entirely showing a rear seat according to a second preferred embodiment of the present invention.

FIG. 4 is a schematic side view showing the folding seat of the present invention applied to the rear seat of the van. Referring to FIG. 4, the rear seat S1 is positioned rearward from the front seat S2 and placed on a pair of slide rails 101 (one of two is shown) installed on the floor (F). The slide rails 101 extend in parallel with each other along the floor (F) in the lengthwise direction of the body of the van, thus comprising a pair of lower rails 111 and a pair of upper rails 112 sliding along the lower rails 111.

Figure 5:
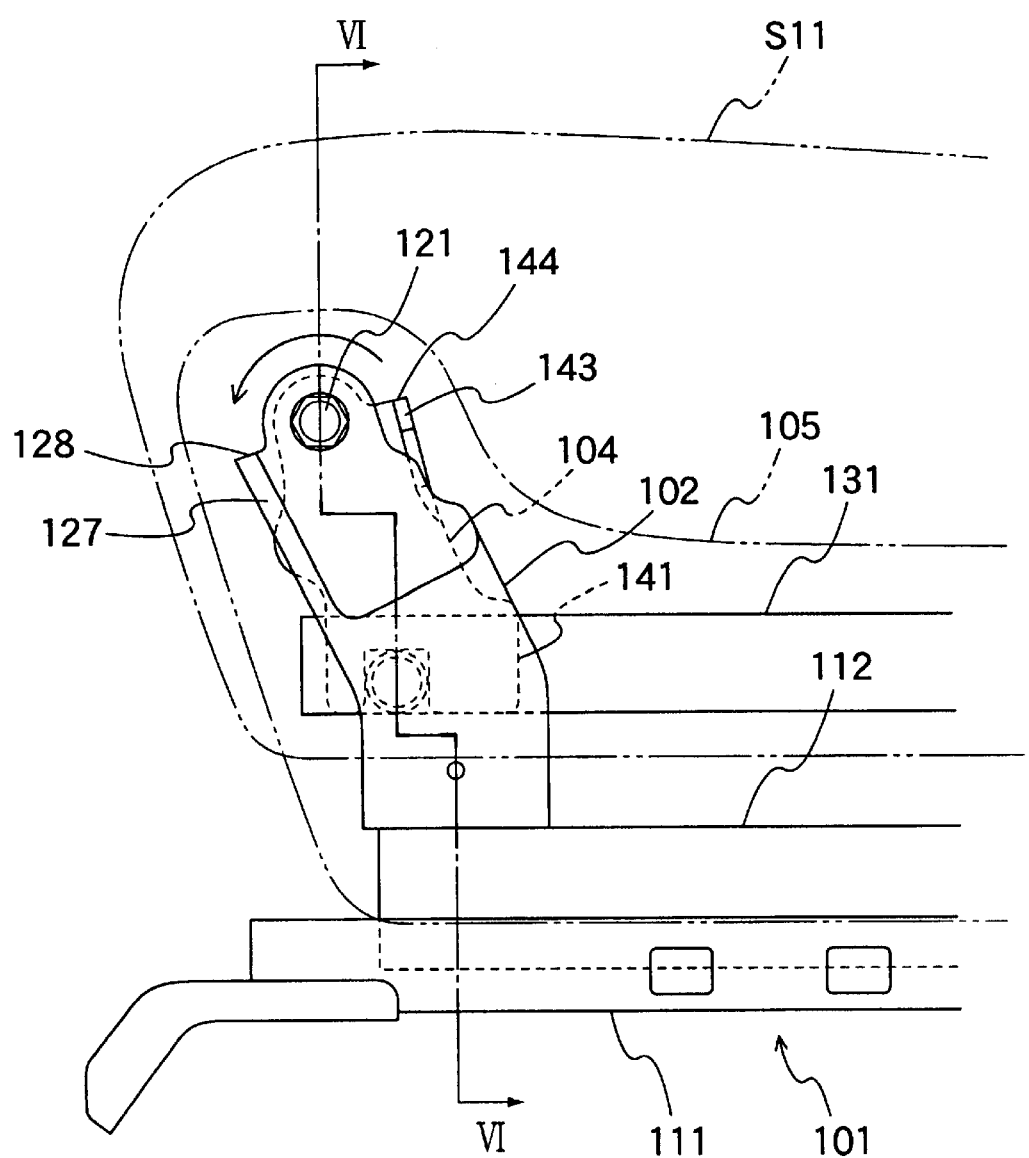
FIG. 5 is an enlarged side view showing an enlarged bracket-installing part according to the second embodiment of the present invention, depicting a portion (A) of FIG. 4.

Referring to FIG. 5, a bracket 102 which will be described in detail later is fixed to the front end of each of the right and left upper rails 112. A stay 104 is formed on the front end of a frame pipe 131 of the seat cushion S11 of the rear seat S1. The stay 104 is rotatably connected with the bracket 102, with a shaft member 121 inserted through a through hole formed on the upper end of the bracket 102 and a through hole formed on the upper end of the stay 104. This construction allows the rear end of the seat cushion S11 to be pulled upward and the seat cushion S11 to be pivoted forward over the slide rail 101 on the shaft member 121. That is, the construction allows the seat cushion S11 to be inverted at a predetermined forward position, as shown by the arrow of FIG. 4. The inverted seat cushion S11 (see the two-dot chain line in FIG. 4) is held by a stopper formed on each of the bracket 102 and the stay 104 such that the bottom plate 132 is horizontal. The stopper will be described in detail later.

Figure 6:
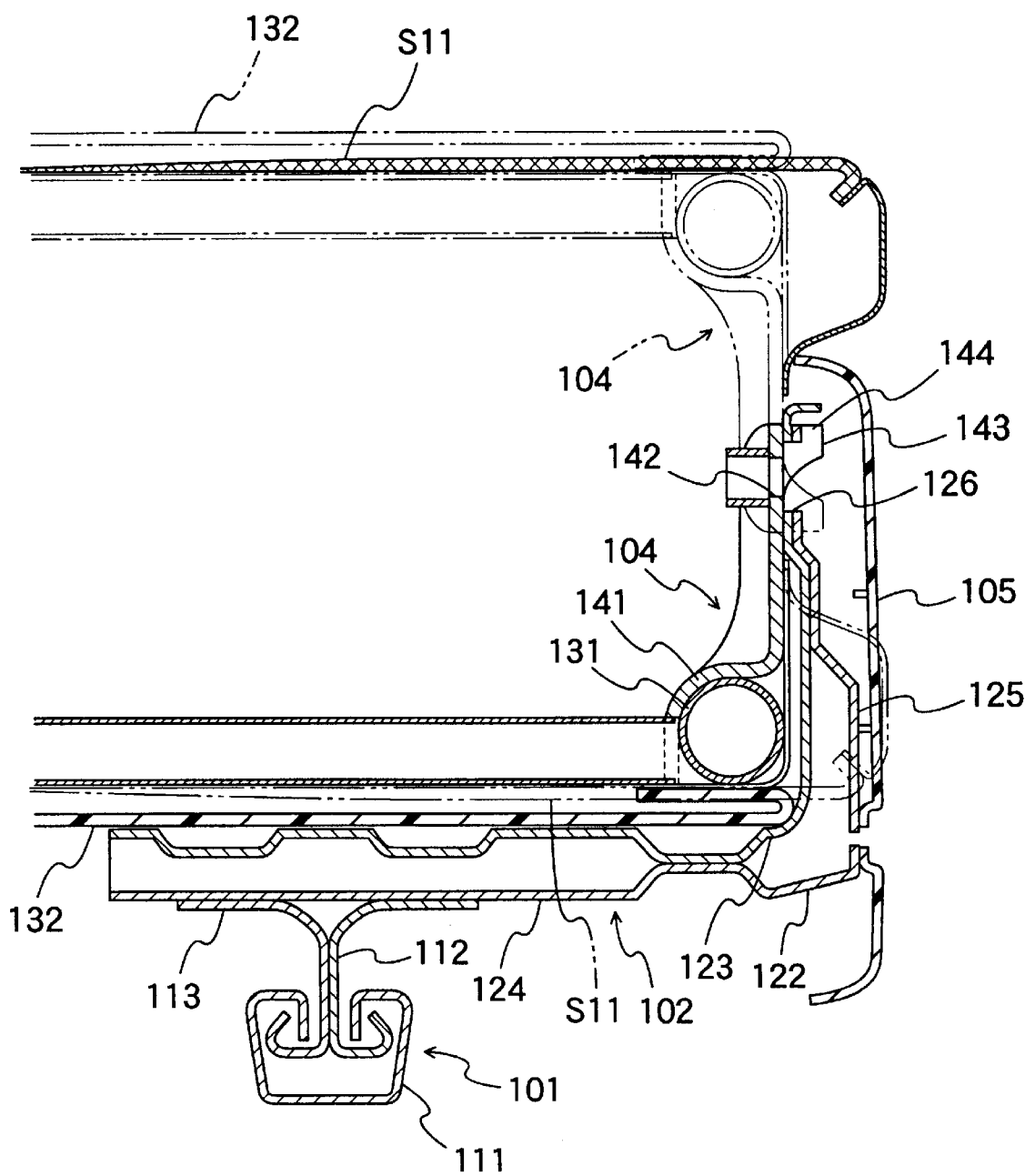
FIG. 6 is a half transverse sectional view taken along a line of VI—VI of FIG. 5, showing a seat cushion according to the second embodiment of the present invention.
Figure 7:
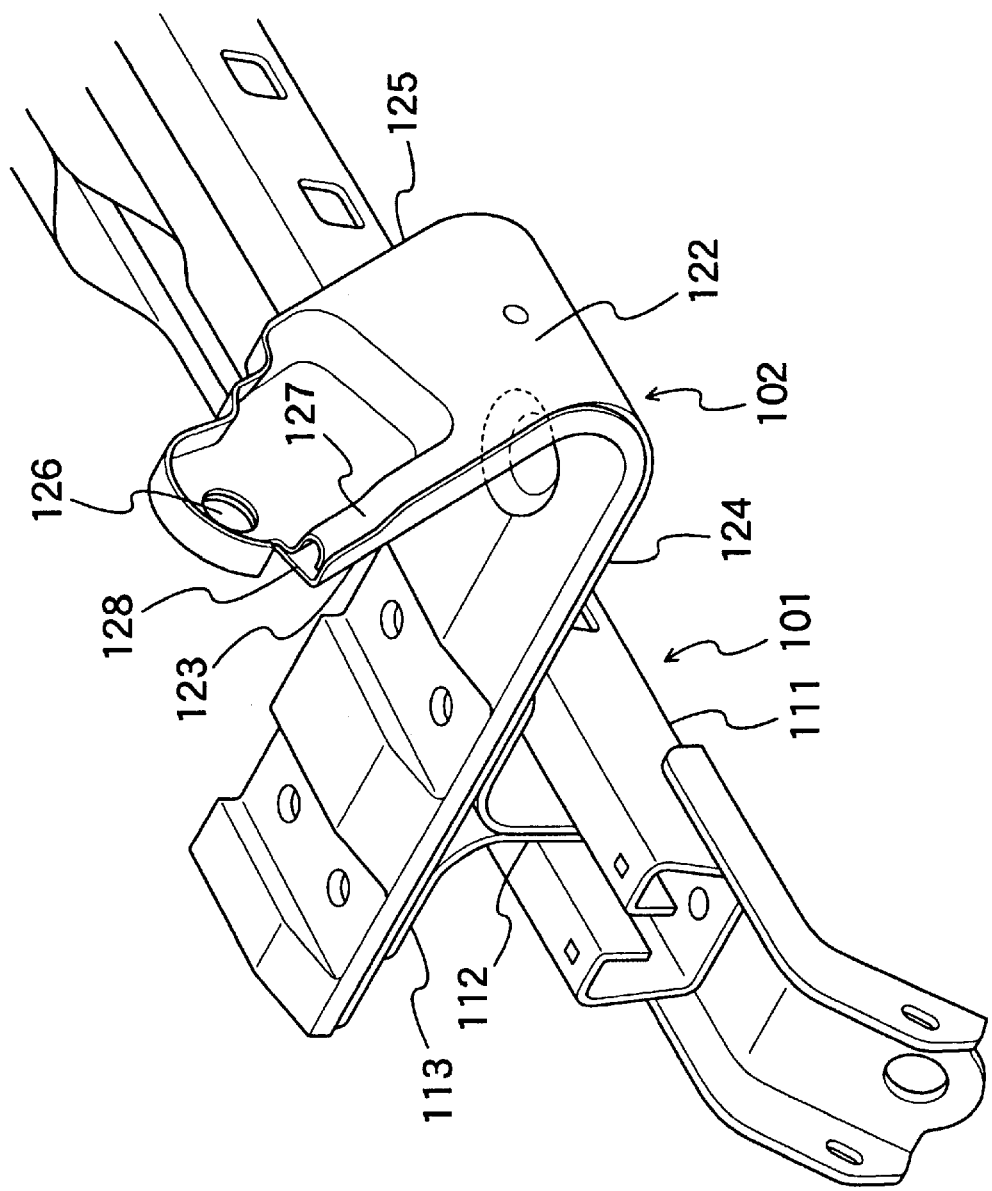
FIG. 7 is a perspective view showing a bracket provided on a slide rail according to the second embodiment of the present invention.

As shown in FIGS. 6 and 7, the bracket 102 formed on the upper rail 112 is formed in the same "L" shape by molding. An outer plate member 122 and an inner plate member 123 of the bracket 102 are brought into contact with each other to form a sectionally flat closed space. The lower surface of a horizontal part 124 of the bracket 102 is fixed to an installing seat 113 of the upper rail 112. A protection cover 105 made of resin is installed on a vertical part 125 of the bracket 102. Most of the upper part of the vertical part 125 of the outer plate member 122 is concave toward the inner plate member 123 to form a concave portion, except the front end (left end of FIG. 7) of the vertical part 125. An opening 126 through which the shaft member 121 (see FIG. 5) is inserted is formed on the upper end of the concave portion. At the front end of the vertical part 125, the outer plate member 122 bent in the shape of a mountain in section is in contact with the inner plate member 123, thus forming a sectionally erected closed portion. The erected closed portion serves as a stopper 127 having a stopper surface 128 formed on the upper end surface thereof.

Referring to FIGS. 5 and 6, the lower end of the stay 104 installed on the seat cushion S11 is curved along the periphery of the frame pipe 131 and connected therewith. An opening 142 through which the shaft member 121 is inserted is formed on the upper end of the stay 104 which contacts the bracket 102 such that the opening 142 is coaxial with the opening 126 of the bracket 102. The rear end (right end of FIG. 5) of the upper end of the stay 104 projects curvedly outward toward the protection cover 105, thus serving as a stopper 143 having a stopper surface 144 formed on the upper end surface thereof.

Figure 8:
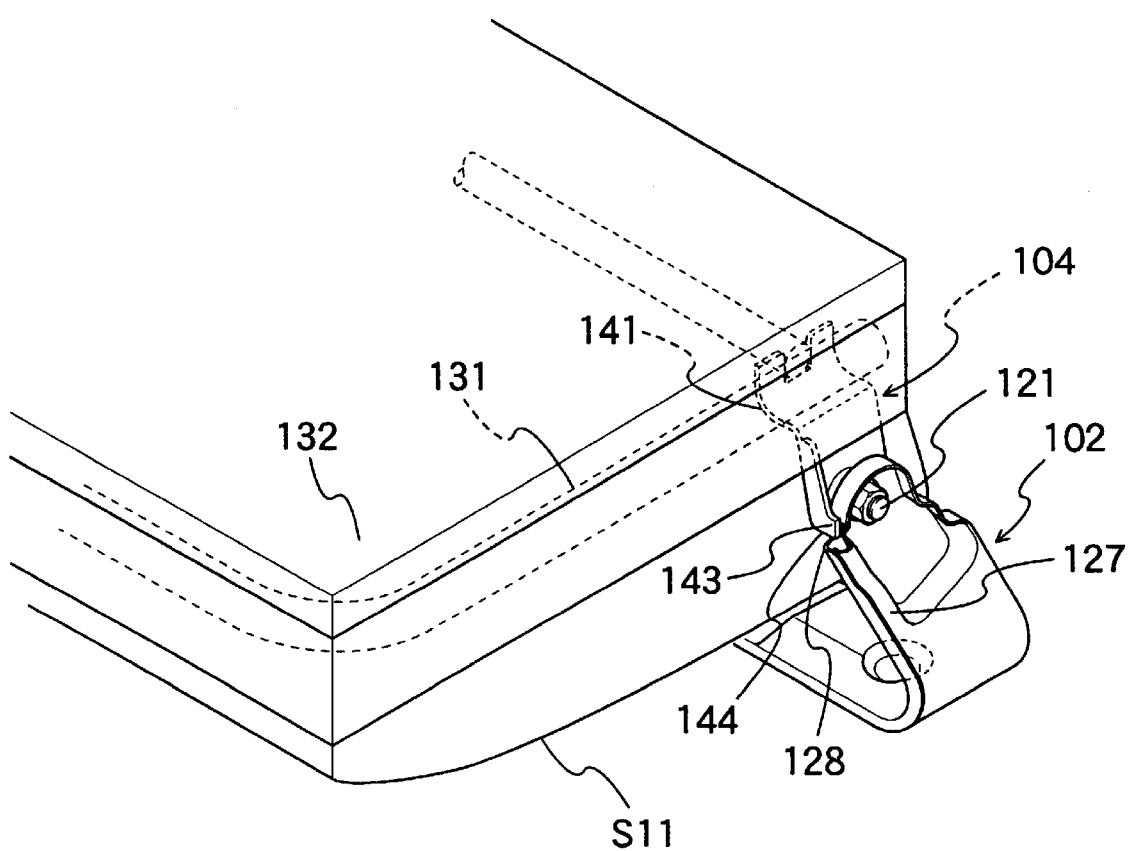
FIG. 8 is a perspective view showing a side edge of an inverted seat cushion according to the second embodiment of the present invention.

When the seat cushion S11 is pivoted forward on the shaft member 121 to invert it (see arrow of FIG. 5) at a predetermined forward position, the stay 104 pivots together with the seat cushion S11 on the shaft member 121, thus taking an inverted state (see the two-dot chain line of FIG. 6). At this time, as shown in FIG. 8, the stopper surface 144 of the stopper 143 of the stay 104 contacts the stopper surface 128 of the stopper 127 of the bracket 102. As a result, the seat cushion S11 is prevented from being pivoted further, with the bottom plate 132 of the inverted seat cushion S11 being horizontal and turned upside.

In order to form a full flat baggage-placing surface in the interior of the van body by folding the rear seat S1 having the above-described construction, the seat cushion S11 is pivoted forward on the shaft member 121 and inverted at a predetermined forward position, as shown by the two-dot chain lines of FIG. 4. Then, the head rest S13 is removed from the upper end of the seat back S12. Then, the reclining mechanism 113 is operated to tilt the seat back S12 pivotally forwardly (see the two-dot chains of FIG. 4) to the space in which the seat cushion S11 has been positioned to form a horizontal continuous surface consisting of the bottom plate 132 of the inverted seat cushion S11 and the rear plate 161 of the seat back S12 tilted pivotally forwardly. In this manner, it is possible to form the wide horizontal baggage-placing surface which is substantially on a level with the upper surface of the luggage box (B) provided in the rear part of the interior of the van body. It is possible to place a large amount of baggage and several long pieces of baggage on the horizontal baggage-placing surface. Because the stopper 127 of the bracket 102 is cylindrical and erect, the stopper 127 is capable of reliably supporting the seat cushion S11 without the stopper 127 being deformed when a comparatively great load is applied thereto through the seat cushion S11.

In the second embodiment, the stoppers 127 and 143 for holding the seat cushion S11 horizontally are formed on each of the bracket 102 and the stay 104 positioned in the periphery of the shaft member 121. Thus, the stoppers 127 and 143 do not interfere with a person when the person is seated on the seat cushion S11. Further, because the bracket 102 is positioned over the upper rail 112, the inverted seat cushion S11 can be held horizontally irrespective of a lengthwise position of the seat cushion S11 when the rear seat S1 is slid lengthwise.

In the second embodiment, the stopper 143 which contacts the stopper 127 of the bracket 102 is formed on the stay 104 fixed to the frame pipe 131 of the seat cushion S11. However this construction is only a example in providing the seat cushion S11 with a member contacting the stopper 127 of the bracket 102.

Third Embodiment

Figure 9:
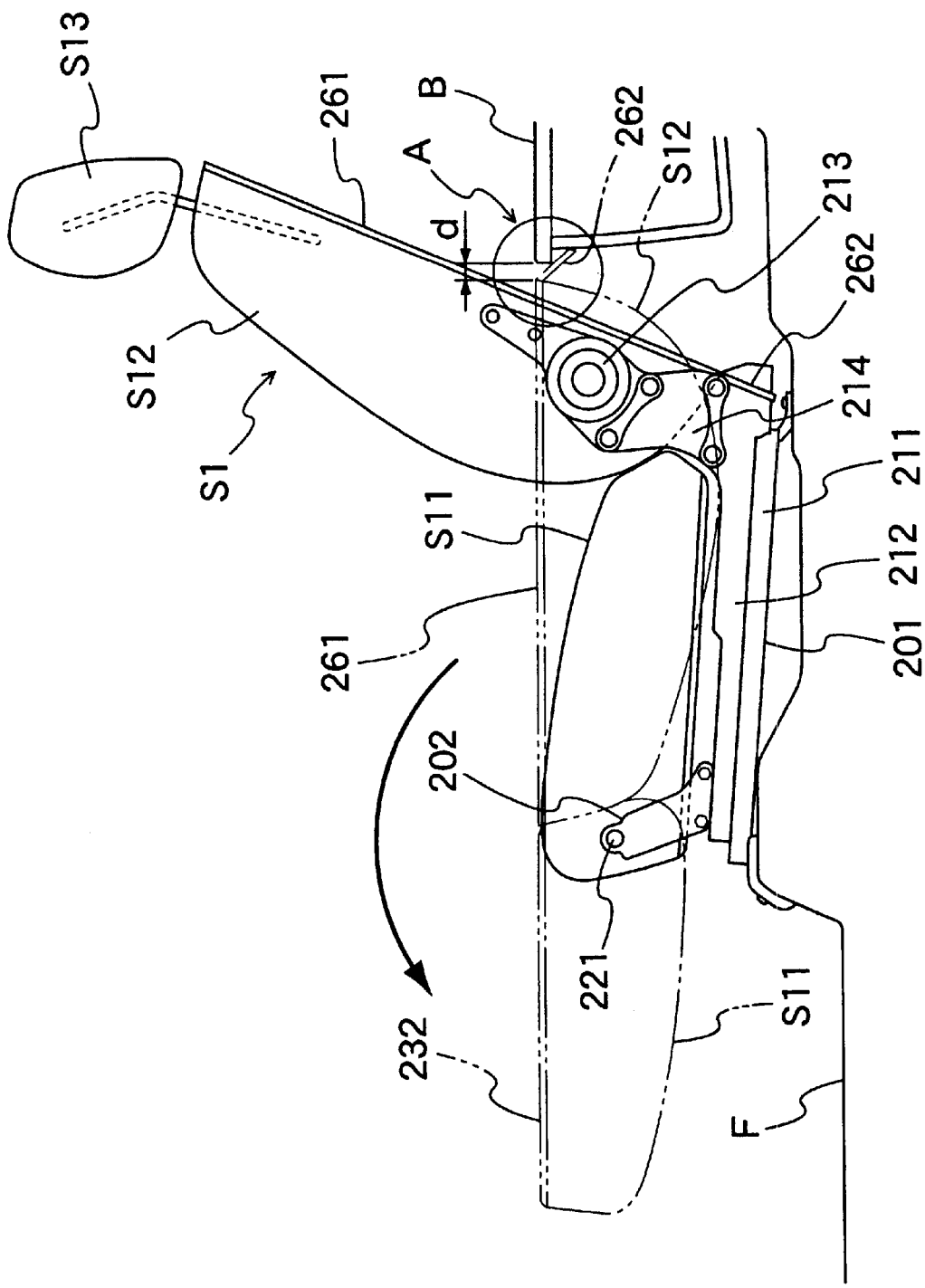
FIG. 9 is a schematic side view entirely showing a rear seat according to a third preferred embodiment of the present invention.

FIG. 9 is a schematic side view showing the folding seat of the third preferred embodiment applied to the rear seat of the van. Referring to FIG. 9, the rear seat S1 is placed on a pair of slide rails 201 (one of two is shown) installed on the floor (F). The slide rails 201 extend in parallel with each other along the floor (F) lengthwise, thus comprising a pair of lower rails 211 and a pair of upper rails 212 sliding along the lower rails 211.

A bracket 202 is fixed to the front end of each of the right and left upper rails 212. The front end of the seat cushion S11 is rotatably supported by a shaft member 221 inserted through the upper end of the bracket 202. This construction allows the rear end of the seat cushion S11 to be pulled upward and the seat cushion S11 to be pivoted forward over the slide rail 201 on the shaft member 221. That is, the construction allows the seat cushion S11 to be inverted at a predetermined forward position, as shown by the arrow of FIG. 9. The inverted seat cushion S11 (see the two-dot chain line in FIG. 9) is held by a stopper a left parenthesis not shown in FIG. 9 a right parenthesis such that a bottom plate 232 is horizontal. A bracket 214 is fixed to the rear end of the upper rail 212. The lower end of the seat back S12 is connected with the bracket 214 through a reclining mechanism 213.

In order to form a full flat baggage-placing surface in the interior of the van body by folding the rear seat S1, the head rest S13 is removed from the upper end of the seat back S12. Then, the reclining mechanism 213 is operated to tilt the seat back S12 pivotally forward (see the two-dot chains of FIG. 4) to the space in which the seat cushion S11 has been positioned. The bottom plate 232 of the inverted seat cushion S11 and the rear plate 261 of the seat back S12 tilted pivotally forwardly form a horizontal continuous surface. At this time, the rear edge of the rear plate 261 of the seat back S12 is proximate to the front edge of the upper surface of the luggage box (B) provided on the floor (F) in the rear part of the interior of the van body. In this manner, it is possible to form the wide horizontal baggage-placing surface having substantially the same level as that of the luggage box (B), namely, the level of the rear half part of the floor (F). Thus, it is possible to place a large amount of baggage and long baggage on the horizontal baggage-placing surface.

Figure 10:
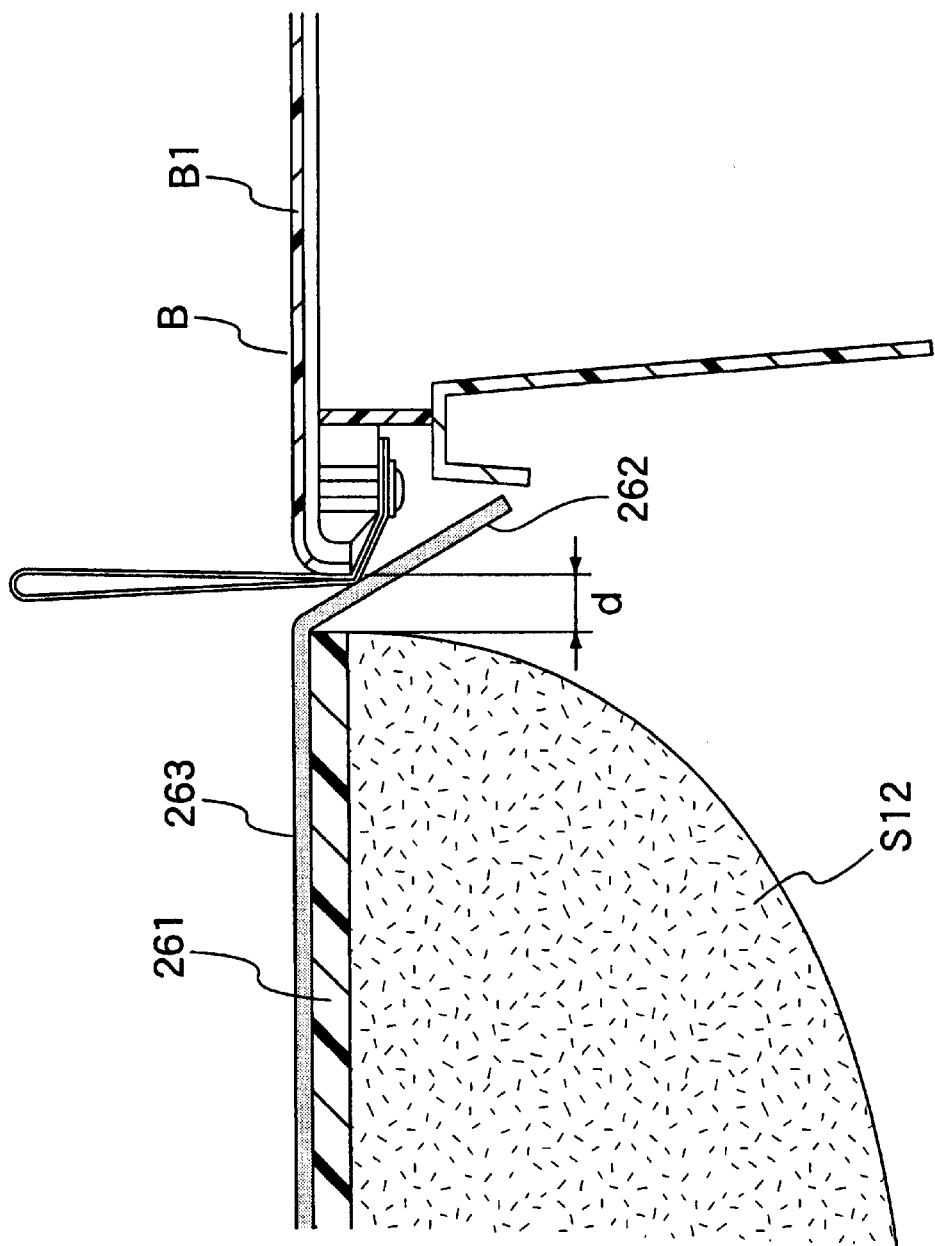
FIG. 10 is an enlarged sectional view showing a rear edge of a seat back in a full flat state according to the third embodiment of the present invention, showing a portion (A) of FIG. 9.

Normally, there is a gap (d) between the rear edge of the rear plate 261 of the seat back S12 and the front edge of the upper surface of the luggage box (B) to prevent both edges from interfering with each other. The discontinuity of the flat baggage-placing surface causes it to be unattractive. In order to prevent the baggage-placing surface from looking unattractive, an extended projecting 262 is formed by attaching carpet cloth 263 longer by a predetermined length than the surface of the rear plate 261, with the excess portion projected from the lower end of the rear plate 261, as shown in FIG. 10. In the state in which the seat back S12 is tilted pivotally forwardly, the upper surface of the extended portion 262 contacts the front edge of a cover B1 of the luggage box (B) and is bent obliquely downwardly (to the right in FIG. 10), thus closing the gap (d). The gap (d) between the rear edge of the rear surface of the seat back S12 and the front edge of the upper surface of the luggage box (B) is filled up by the extended portion 262. Thus, the baggage-placing surface is prevented from looking unattractive. Further, even though the height of the rear plate 261 of the seat back S12 and that of the luggage box (B) are a little different from each other, the extended portion 262 makes the difference in the heights smaller.

In the third embodiment, the extended portion is formed by attaching the carpet cloth longer by the predetermined length than the surface of the rear plate, with the excess portion projected from the lower end of the rear plate. However if the rear plate of the seat back is made of resin, the extended portion may be formed by extending the rear plate in the predetermined length such that the extended portion is thinner than the rear plate. It is preferable that the extended portion is made of a flexible material because the flexible material adapts itself to the length of the gap (d) owing to its deformation.

Fourth Embodiment

Figure 11:
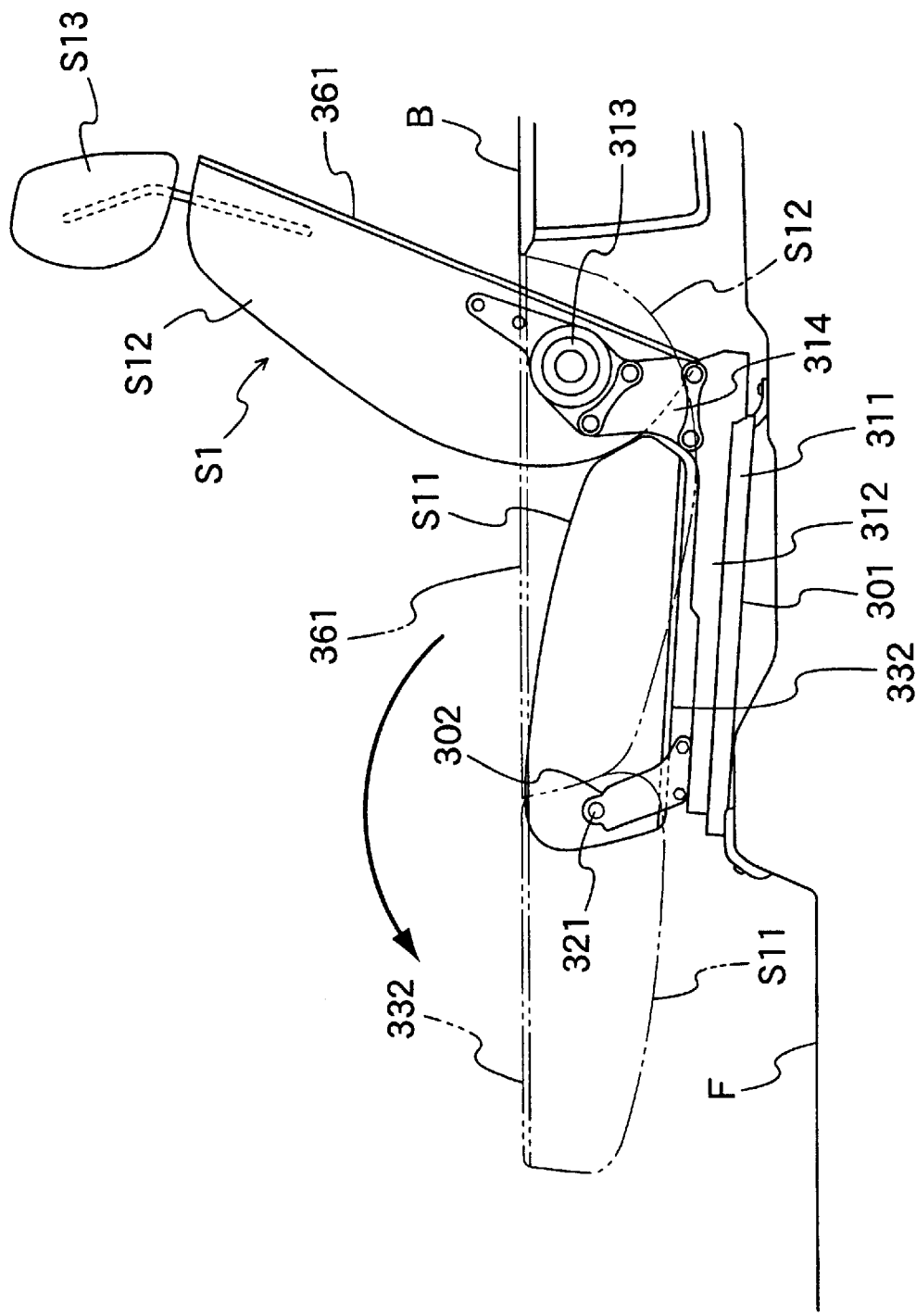
FIG. 11 is a schematic side view entirely showing a rear seat according to a fourth preferred embodiment of the present invention.

FIG. 11 is a schematic side view showing the folding seat of the present invention applied to the rear seat of the van. Referring to FIG. 11, the rear seat S1 is placed on a pair of slide rails 301 (one of two is shown) installed on the floor (F). The right and left slide rails 301 extend in parallel with each other along the floor (F) lengthwise, thus comprising a pair of lower rails 311 and a pair of upper rails 312 sliding along the lower rails 311.

A bracket 302 is fixed to the front end of each of the right and left upper rails 312. The front end of the seat cushion S11 is rotatably supported by a shaft member 321 inserted through the upper end of the bracket 302. This construction allows the rear end of the seat cushion S11 to be pulled upward and the seat cushion S11 to be pivoted forward over the slide rail 301 on the shaft member 321. That is, the construction allows the seat cushion S11 to be inverted at a predetermined forward position, as shown by the arrow of FIG. 11. The inverted seat cushion S11 (see the two-dot chain line in FIG. 11) is held by a stopper a left parenthesis not shown in FIG. 11 a right parenthesis such that a bottom plate 332 is horizontal. A bracket 314 is fixed to the rear end of the upper rail 312. The lower end of the seat back S12 is connected with the bracket 314 through a reclining mechanism 313.

In order to form a full flat baggage-placing surface in the interior of the van body by folding the rear seat S1, the head rest S13 is removed from the upper end of the seat back S12. Then, the reclining mechanism 313 is operated to tilt the seat back S12 pivotally forwardly (see the two-dot chains of FIG. 4) to the space in which the seat cushion S11 has been positioned. The bottom plate 332 of the inverted seat cushion S11 and the rear plate 361 of the seat back S12 tilted pivotally forwardly form a horizontal continuous surface. In this manner, it is possible to form the wide flat baggage-placing surface which is substantially on a level with the upper surface of the luggage box (B) provided in the rear part of the interior of the van body. It is possible to place a large amount of baggage and long baggage on the flat baggage-placing surface.

Figure 12:
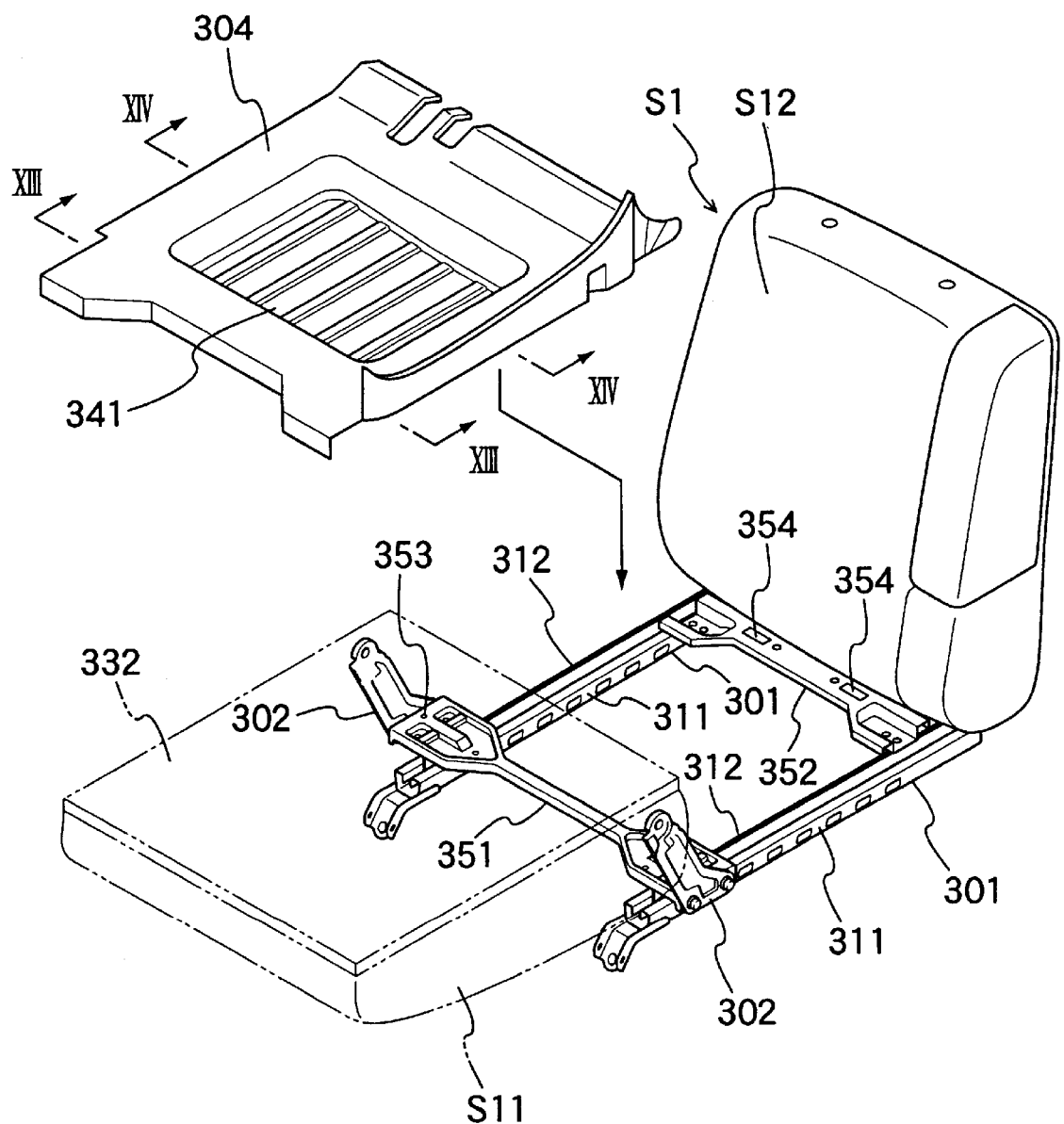
FIG. 12 is an exploded perspective view showing an inverted seat cushion according to the fourth embodiment of the present invention.

As shown in FIG. 12, the right and left slide rails 301 are exposed in the state in which the seat cushion S11 is inverted and the seat back S12 is not tilted pivotally forwardly, which is not preferable in the appearance of the interior of the van and safety. In consideration of this, in the fourth embodiment, a baggage-accommodating tray 304 is provided to cover the right and left slide rails 301, as shown in FIG. 12. The baggage-accommodating tray 304 is rectangularly formed by one-piece molding of resin and a little larger than the bottom plate 332 of the seat cushion S11. The central part of the baggage-accommodating tray 304 is similar to the outer configuration thereof and concave to form a baggage-accommodating part 341.

Figure 13:
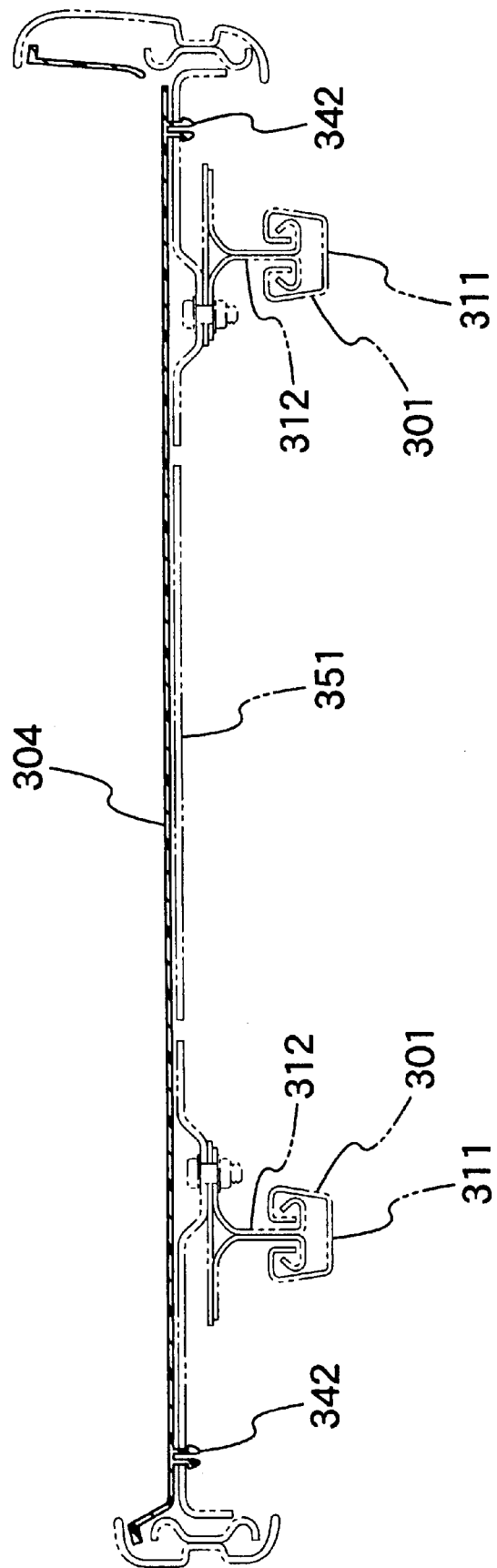
FIG. 13 is a sectional view taken along a line XIII—XIII of FIG. 12, showing a baggage-accommodating tray according to the fourth embodiment of the present invention.
Figure 14:
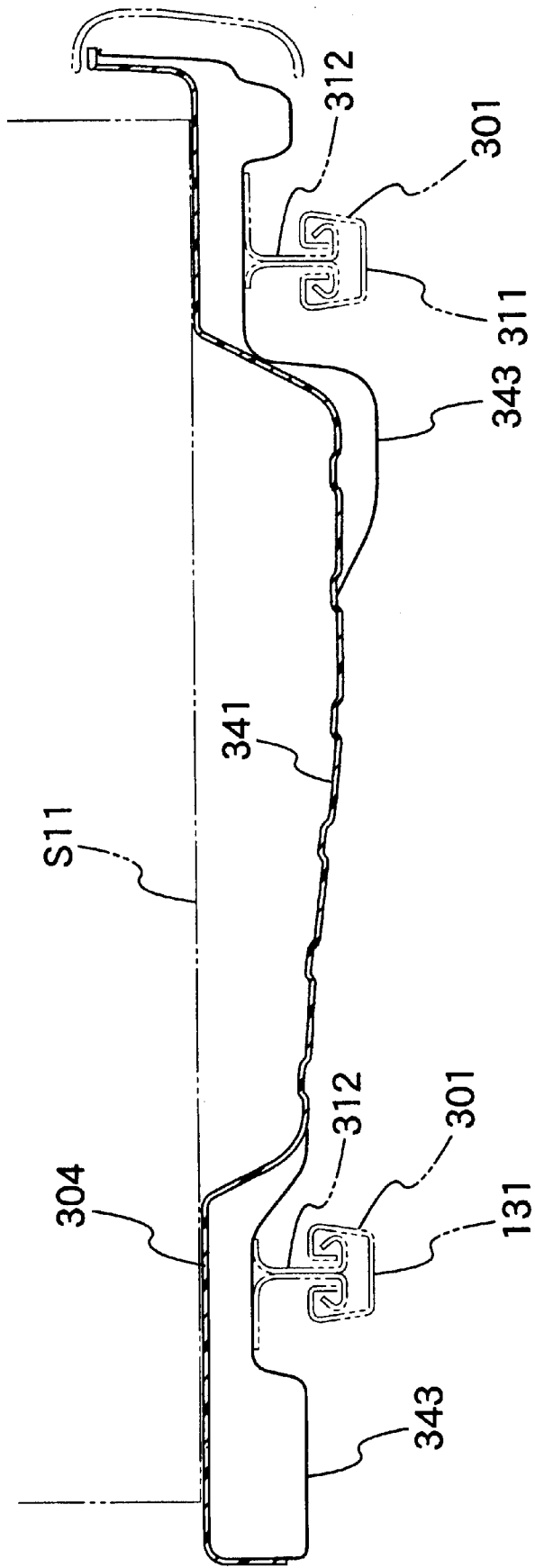
FIG. 14 is a sectional view taken along a line XIV—XIV of FIG. 12, showing a baggage-accommodating tray according to the fourth embodiment of the present invention.

The baggage-accommodating tray 304 is fixed to reinforcements 351 and 352 (see FIG. 12) connecting the right and left upper rails 312 with each other at front and rear positions thereof by fixedly inserting locking pieces 342 projecting downward from four corners (only a pair is shown in FIG. 13) on the bottom surface of the baggage-accommodating tray 304 into installing holes 353 of the reinforcement 351 and installing holes 354 of the reinforcement 352. As shown in FIG. 14, a rib 343 is projected at the right and left edges at an intermediate portion of the baggage-accommodating tray 304 in the lengthwise direction of the van body. The ribs 343 are placed on the upper rails 312.

Figure 15:
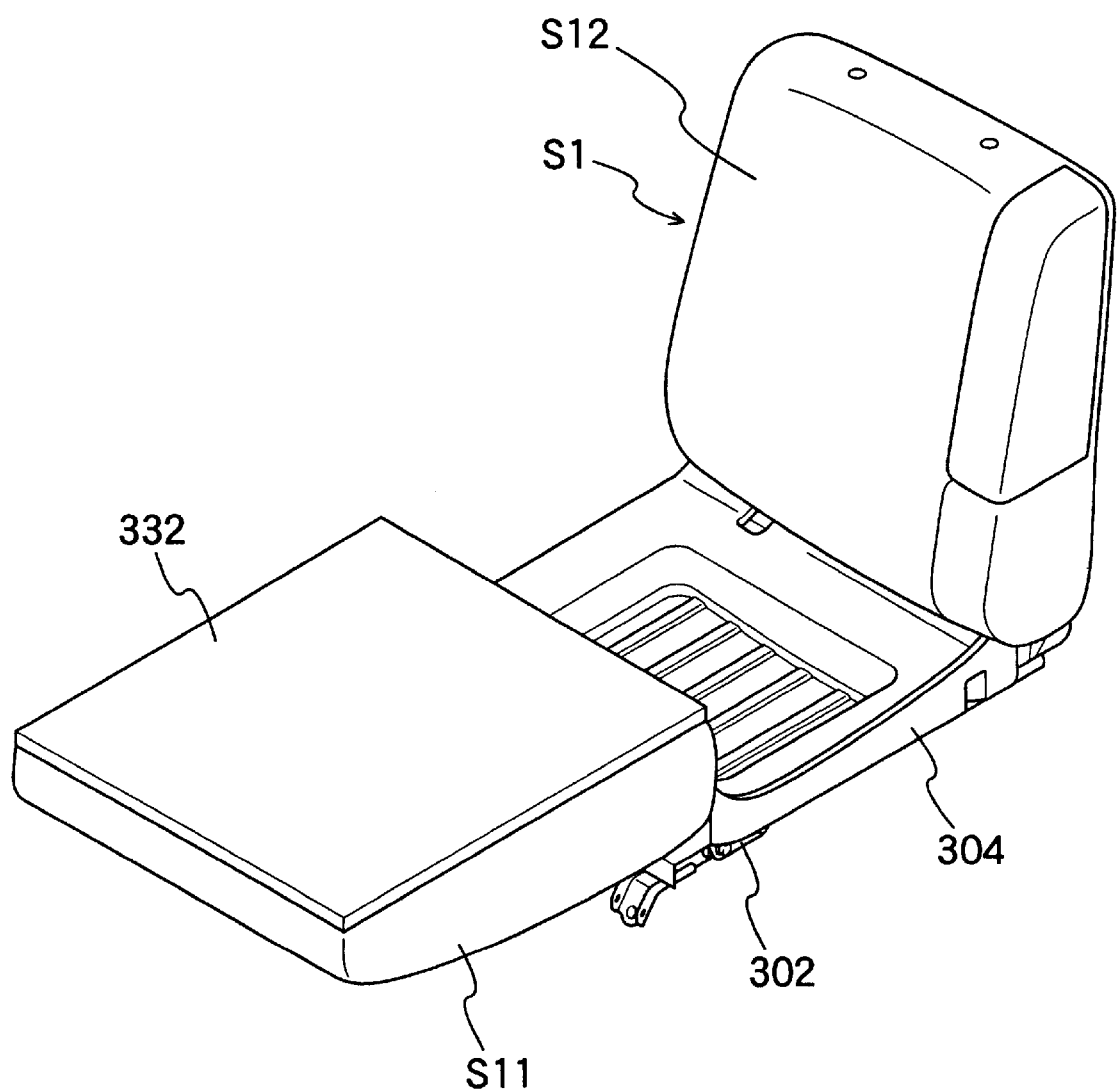
FIG. 15 is a perspective view showing an inverted seat cushion according to the fourth embodiment of the present invention.

As shown in FIG. 15, when the seat cushion S11 is pivoted forward to invert it at the predetermined forward position, the right and left slide rails 301 are covered with the baggage-accommodating tray 304 installed thereon. When the seat back S12 is not tilted pivotally forwardly, as shown in FIG. 15, the baggage-accommodating part 341 of the baggage-accommodating tray 304 accommodates various kinds of packages and round baggage which rolls when the van starts and stops. Further, as shown in FIG. 14, when the seat cushion S11 is pivoted back to the original position, the seat cushion S11 is seated on the right and left edges of the baggage-accommodating tray 304, thus covering the concave baggage-accommodating part 341. Thus, the baggage-accommodating part 341 is suitable for accommodating valuables.

Fifth Embodiment

Figure 16:
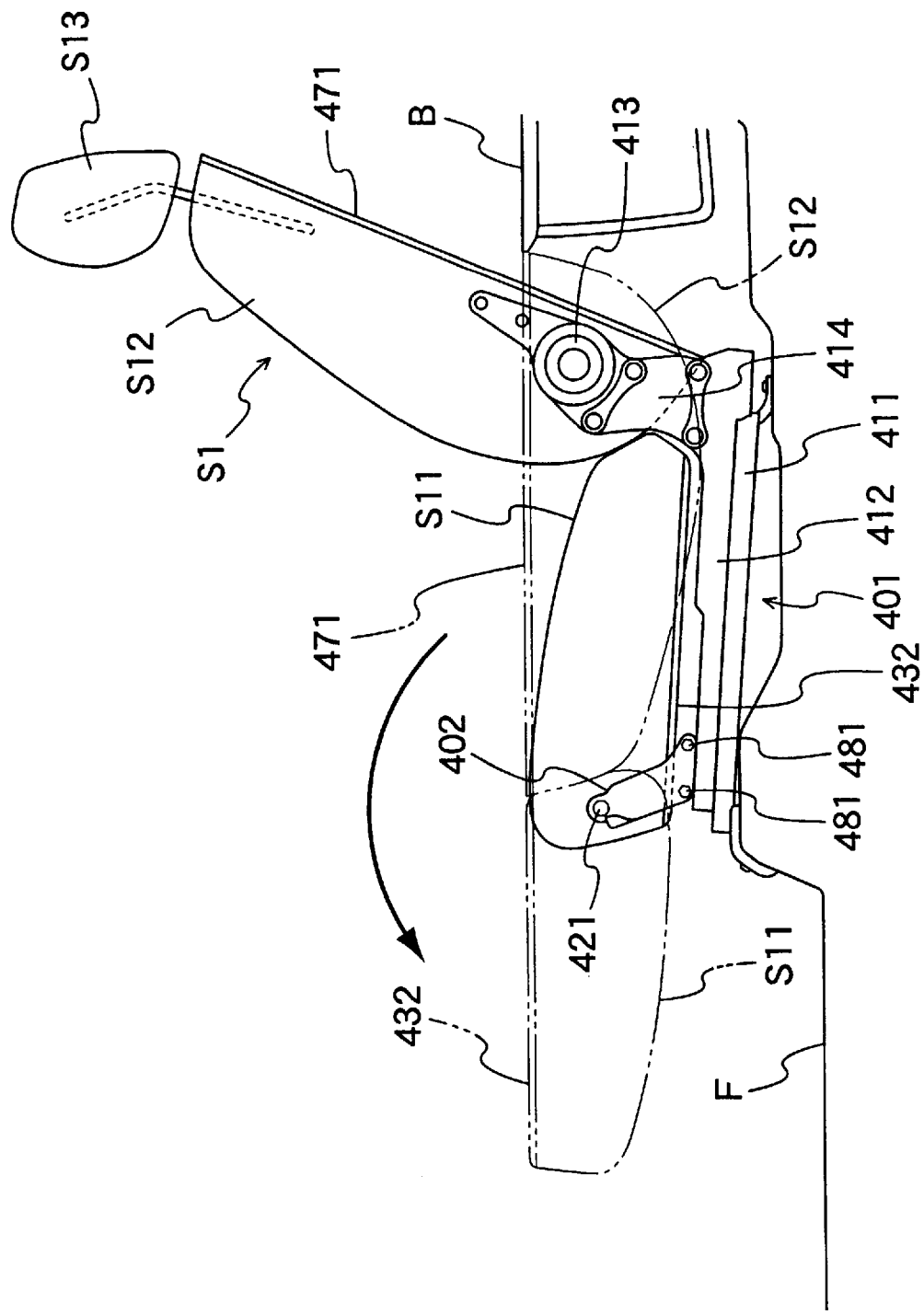
FIG. 16 is a schematic side view entirely showing a rear seat according to a fifth preferred embodiment of the present invention.

FIG. 16 is a schematic side view showing the folding seat of the fifth preferred embodiment applied to the rear seat of the van. Referring to FIG. 16, the rear seat S1 is placed on a pair of slide rails 401 (one of two is shown) installed on the floor (F). The right and left slide rails 401 extend in parallel with each other along the floor (F) in the lengthwise direction of the body of the van, thus comprising a pair of lower rails 411 and a pair of upper rails 412 sliding along the lower rails 411.

Figure 17:
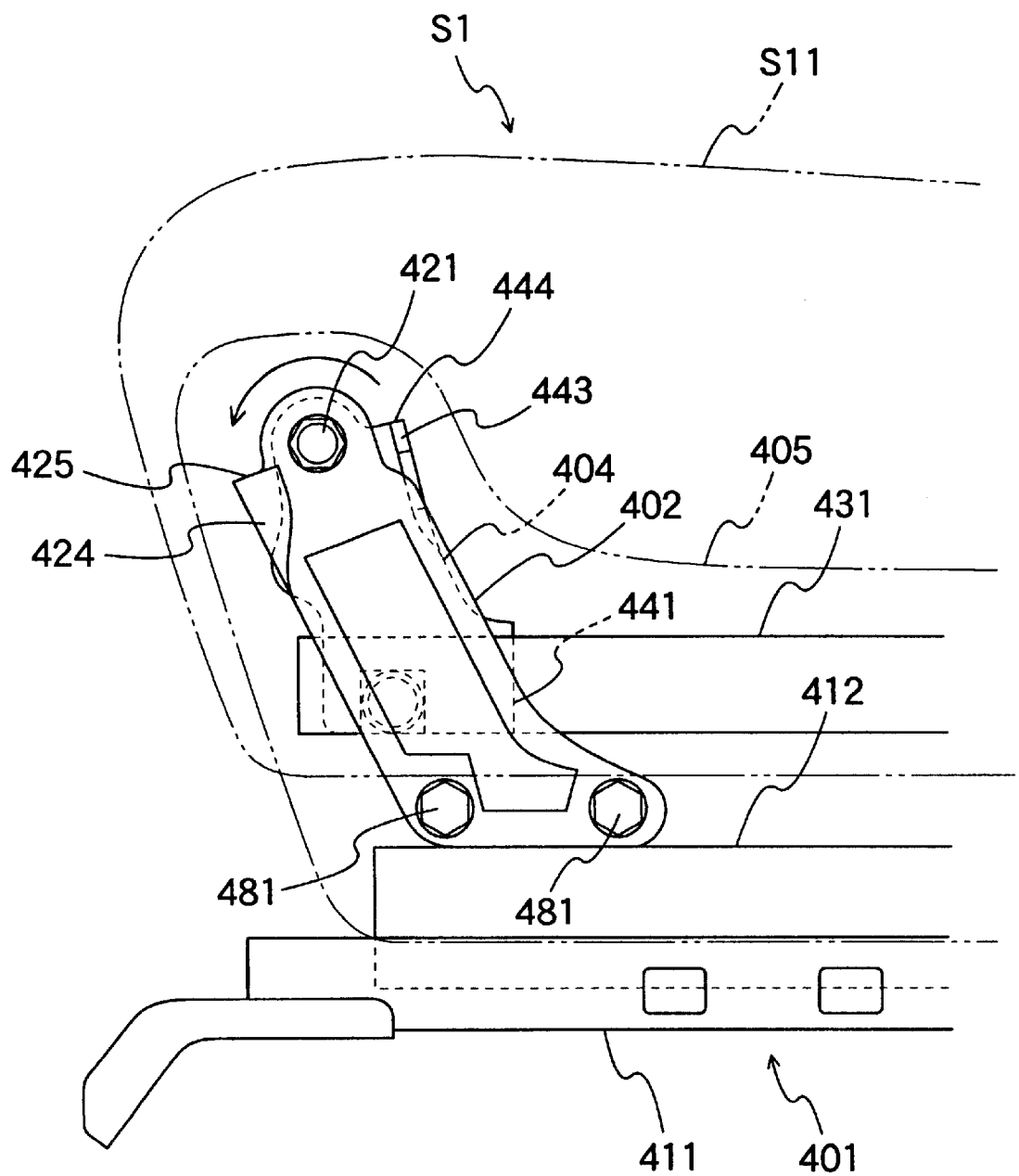
FIG. 17 is an enlarged side view showing a bracket-installing part according to the fifth embodiment of the present invention.

Referring to FIG. 17, a bracket 402 which will be described in detail later is fixed to the front end of each of the right and left upper rails 412. A stay 404 is formed on the front end of a frame pipe 431 of the seat cushion S11 of the rear seat S1. The stay 404 is rotatably connected with the bracket 102, with a shaft member 421 inserted through a through hole formed on the upper end of the bracket 402 and a through hole formed on the upper end of the stay 404. This construction allows the rear end of the seat cushion S11 to be pulled upward and the seat cushion S11 to be pivoted forward over the slide rail 401 on the shaft member 421. That is, the construction allows the seat cushion S11 to be inverted at a predetermined forward position, as shown by the arrow of FIG. 16. The inverted seat cushion S11 (see the two-dot chain line in FIG. 16) is held by a stopper formed on each of the bracket 402 and the stay 404 such that the bottom plate 432 is horizontal. The stopper will be described in detail later. A bracket 414 is fixed to the rear end of the upper rail 412. The lower end of the seat back S12 is connected with the bracket 414 through a reclining mechanism 413.

Figure 18:
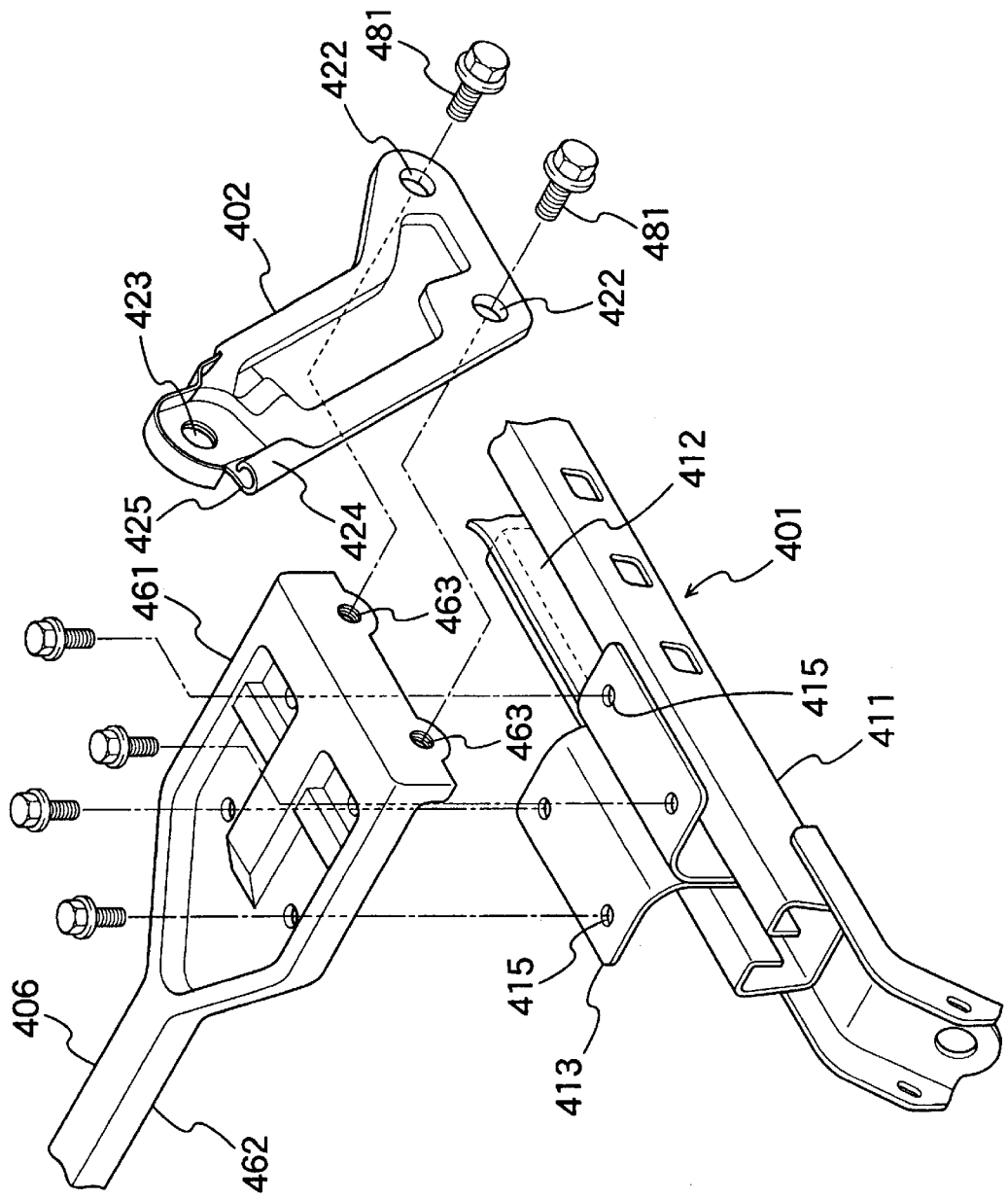
FIG. 18 is an enlarged exploded perspective view showing the bracket-installing part according to the fifth embodiment of the present invention.
Figure 19:
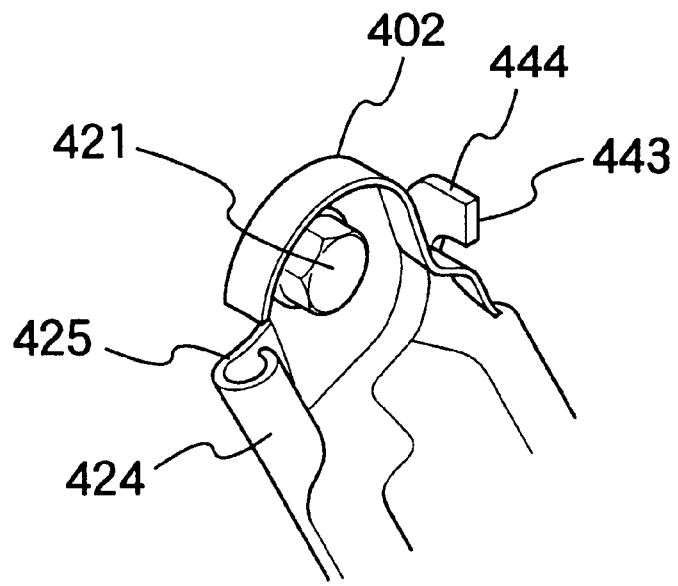

FIG. 18 shows the construction for installing the bracket 402 on the upper rail 412. Referring to FIG. 18, a T-shaped receiving portion 413 is formed at the front end of each of the right and left upper rails 412. A reinforcement 406 connecting the right and left upper rails 412 with each other is fixed to the receiving portion 413 by fixing one end part 461 of the reinforcement 406 to the receiving seat 413 with bolts tightened into holes formed on the one end part 461 and into installing holes 415 formed on the four corners of the receiving portion 413. The one end part 461 is wider than a connection part 462 connecting both end parts 461 with each other. Installing screw holes 463 are formed on front and rear positions (right and left positions in FIG. 18) of an end surface of the end part 461. The bracket 402 is formed of a molded metal plate. Installing circular openings 422 are formed at front and rear positions of the lower end portion of the bracket 402. A bolt 481 is inserted into each of the screw holes 463 through each of the circular openings 422 to fix the bracket 402 to the one end surface of the reinforcement 406. The diameter of the circular opening 422 is much larger than that of the screwing portion of the bolt 481. Thus, the position of the bracket 402 can be adjusted vertically and lengthwise within a certain range before the bracket 402 is placed in position with the bolts 481. An opening through which the shaft member 421 (see FIG. 17) is inserted is formed on the upper end of the bracket 402. The front end (left end in FIG. 18) of the upper end of the bracket 402 is curled approximately cylindrically to form a stopper 424 having a stopper surface 425 on the upper end surface thereof.

Referring to FIG. 17, the lower end of the stay 404 installed on the seat cushion S11 is curved along the periphery of the frame pipe 431 and connected with the frame pipe 431. An opening (not shown) through which the shaft member 421 is inserted is formed at the upper end of the stay 404 which contacts the bracket 402 such that the opening is coaxial with the opening 423 (see FIG. 18) of the bracket 402. The rear end (right end of FIG. 17) of the upper end of the stay 404 projects curvedly outward toward the protection cover 405, thus serving as a stopper 443 having a stopper surface 444 formed on the upper end surface thereof.

Figure 20:
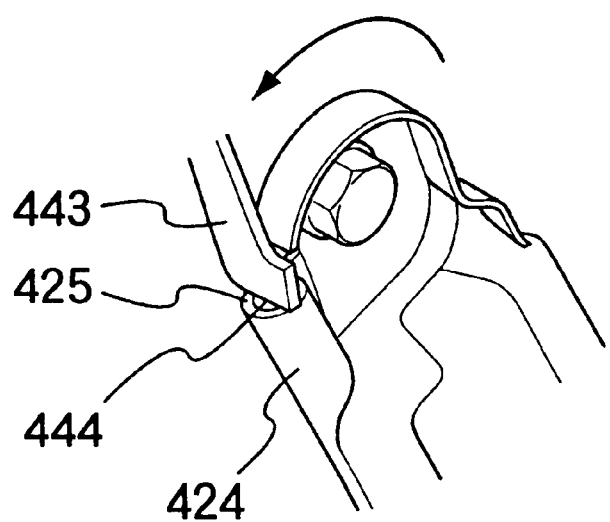
FIG. 20 is an enlarged perspective view showing the upper end portion of the bracket according to the fifth embodiment of the present invention.

When the seat cushion S11 is pivoted forward on the shaft member 421 to invert it (see arrow of FIG. 5) at a predetermined forward position, the stay 404 pivots together with the seat cushion S11 on the shaft member 421, thus taking an inverted state (see the two-dot chain line of FIG. 6). At this time, as shown in FIG. 20, the stopper surface 444 of the stopper 443 of the stay 404 contacts the stopper surface 428 of the stopper 427 of the bracket 402. As a result, the seat cushion S11 is prevented from being pivoted further, with the bottom plate 432 of the inverted seat cushion S11 being horizontal and turned upside.

In order to form a full flat baggage-placing surface in the interior of the van body by folding the rear seat S1 having the above-described construction, the seat cushion S11 is pivoted forward on the shaft member 421 and inverted at a predetermined forward position, as shown by the two-dot chain lines of FIG. 16. Then, the head rest S13 is removed from the upper end of the seat back S12. Then, the reclining mechanism 413 is operated to tilt the seat back S12 pivotally forwardly (see the two-dot chains of FIG. 4) to the space in which the seat cushion S11 has been positioned to form a horizontal continuous surface consisting of the bottom plate 432 of the inverted seat cushion S11 and the rear plate 471 of the seat back S12 tilted pivotally forwardly. In this manner, it is possible to form the wide horizontal baggage-placing surface which is substantially on a level with the upper surface of the luggage box (B) provided in the rear part of the interior of the van. It is possible to place a large amount of baggage and long baggage on the horizontal baggage-placing surface. Because the stopper 424 of the bracket 402 is cylindrical and erect, the stopper 424 is capable of reliably supporting the seat cushion S11 without the stopper 424 being deformed when a comparatively great load of baggage is applied thereto through the seat cushion S11.

Normally, it is unattractive that there is a difference between the height of the rear edge of the bottom plate 432 of the inverted seat cushion S11 and that of the front edge of the rear plate 471 of the seat back S12 tilted pivotally forwardly. In this embodiment, as described previously, the position of the bracket 402 is adjustable vertically and lengthwise. Thus, the height and lengthwise positions of the seat cushion S11 are so adjusted with a jig that the rear edge of the bottom plate 432 of the inverted seat cushion S11 is proximate to the front edge of the rear plate 471 of the seat back S12 tilted pivotally forwardly and further, the height of rear edge thereof and that of the front edge thereof are almost equal to each other, and then, the bolts 481 are tightened into the screw holes 463 to fix the bracket 402 to the upper rail 412.

The height of the front end of the bottom plate 432 of the seat cushion S11 placed in position by the stopper 424 may be dislocated from a predetermined position. In order to position the front end of the bottom plate 432 correctly, the bracket 402 is fixed to the upper rail 412 by adjusting the angle of the bracket 402 such that the level of the front end of the bottom plate 432 is higher than that of the predetermined position and shifting the front end of the bottom plate 432 downward to the predetermined position by applying mechanical force while the stopper surface 425 is being plastically deformed. The stopper surfaces 444,425 originally rough can be smoothed and set by the plastic deformation and thus the rigidity thereof can be ensured. In the fifth embodiment, the sufficiently large circular opening 422 is formed on the bolt 481 to adjust the position of the bracket 402 vertically and lengthwise and adjust the angle thereof. But if the position of the bracket 402 is required to be adjusted only vertically, a slot extending vertically may be formed instead of the circular opening 422.

Sixth Embodiment

Figure 21:
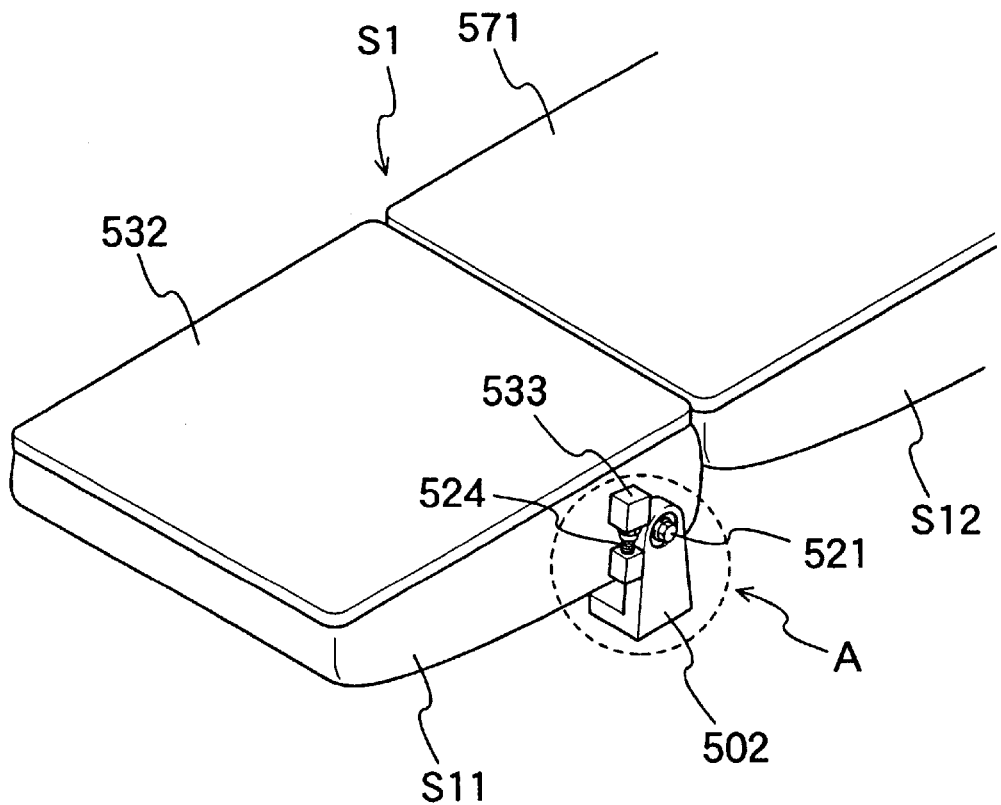
FIG. 21 is a perspective view showing a rear seat in a full flat state according to a sixth preferred embodiment of the present invention.
Figure 22:
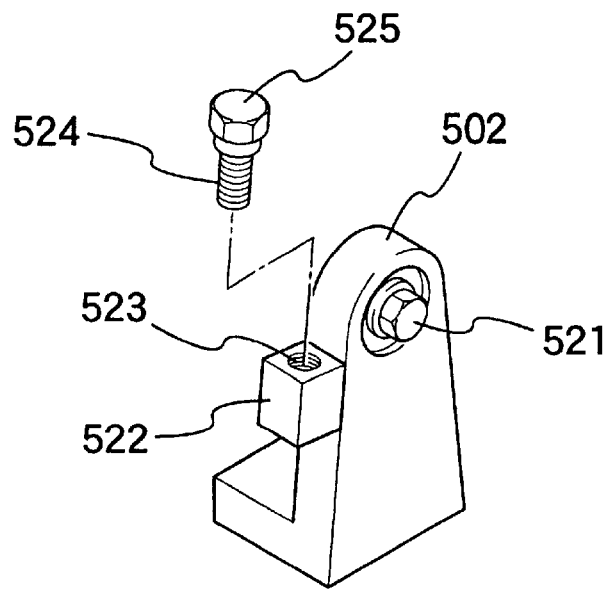
FIG. 22 is an exploded perspective view showing a bracket according to the sixth embodiment of the present invention.

Similarly to the folding seat for a vehicle of the first through fifth embodiments, the seat cushion S11 is pivoted forward to invert it at a predetermined forward position on a shaft member 521 of a bracket 502 fixed to an upper rail of a slide rail (not shown in FIG. 21). The seat back S12 is fixed to a bracket (not shown) fixed to the upper rail of the slide rail through a reclining mechanism. A continuous surface is formed by a bottom plate 532 of the inverted seat cushion S11 and a rear plate 571 of the seat back S12 tilted pivotally forwardly to the space in which the seat cushion S11 has been positioned. As shown in FIG. 22, a cubic stopper member 522 is connected with an upper portion of a side surface of the mountain-shaped bracket 502. A female screw portion 523 open upward is formed on the stopper member 522. In screwing a bolt 524 into the female screw portion 523, a head portion 525 of the bolt 524 moves vertically according to a screwing amount of the bolt 524.

Figure 23:
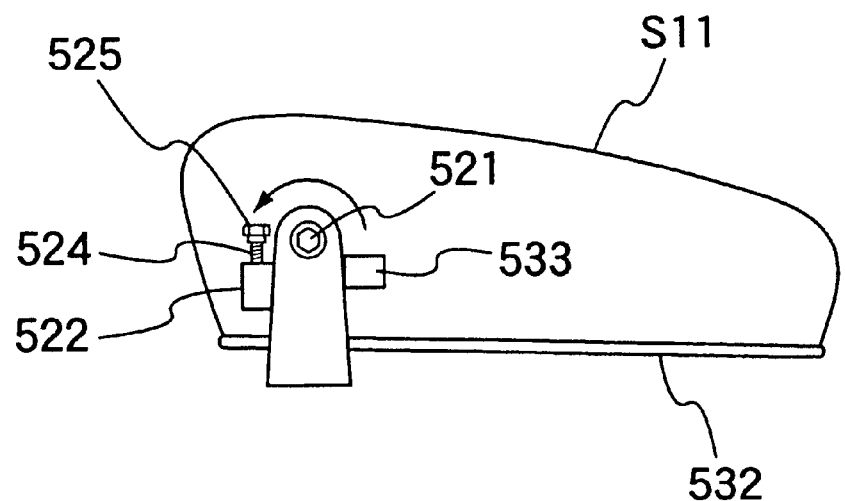
FIG. 23 is a side view showing a seat cushion of the sixth embodiment of the present invention in the original position.
Figure 24:
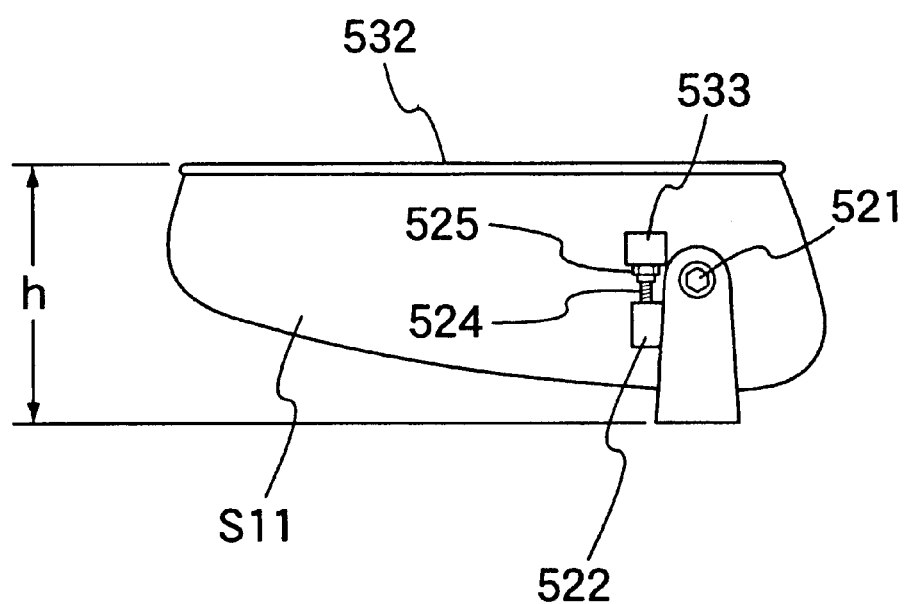
FIG. 24 is a side view showing an inverted seat cushion of the sixth embodiment of the present invention.

Referring to FIG. 23, a block-shaped stopper member 523 projects from a side surface of the seat cushion S11 such that the stopper member 533 is opposite to the position of the stopper member 522 with respect to the shaft member 521. When the seat cushion S11 pivots as shown by the arrow of FIG. 23, the stopper member 533 pivots at about 180 degrees on the shaft member 521, thus contacting the head portion 525 of the bolt 524. Thus, the seat cushion S11 is placed in position, with the bottom plate 532 being horizontal, as shown in FIG. 24. The bottom plate 532 and the rear plate 571 of the seat back S12 form a horizontal continuous surface, as shown in FIG. 21.

Referring to FIG. 24, it is difficult for the inverted seat cushions S11 to have the same height (h) for respective rear seats S1, because errors will occur in installing the stopper member 522 on the bracket 502 and the stopper member 533 on the seat cushion S11 and they will be deformed. In order to allow the height (h) of the inverted seat cushion S11 to be constant, in the sixth embodiment, the position of the head portion 525 of the bolt 524 is changed vertically by altering the screwing amount of the bolt 524.

Seventh Embodiment

Figure 25:
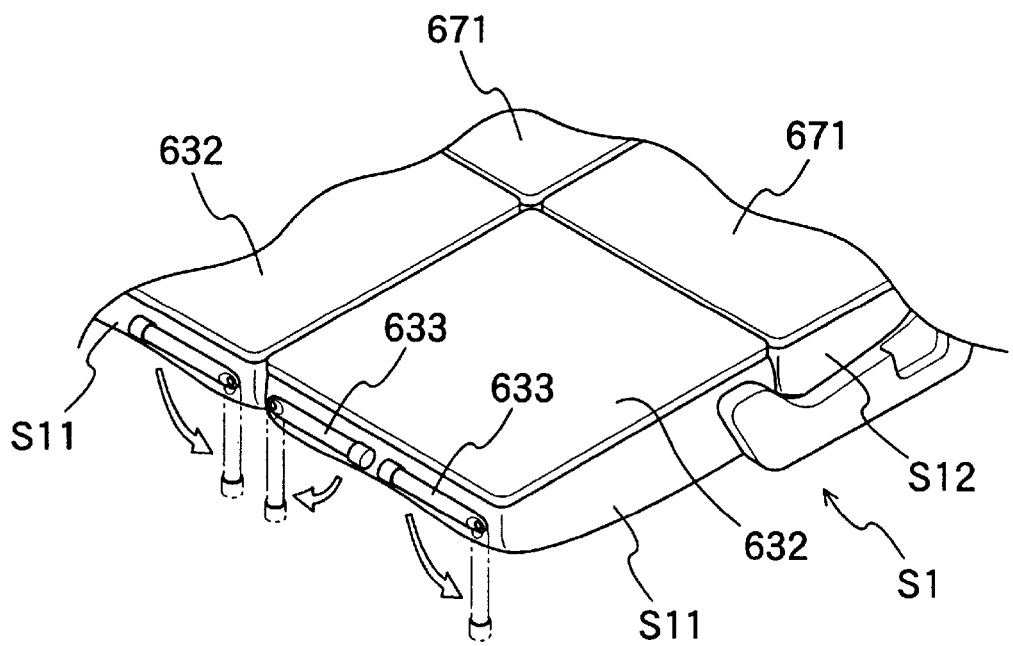
FIG. 25 is a perspective view showing a rear seat in a full flat state according to a seventh preferred embodiment of the present invention.

In the seventh embodiment, the seat cushion S11 of the folding seat for a vehicle of the first through sixth embodiments is provided with a supporting member which is positioned at the front end surface of the inverted the seat cushion S11. Referring to FIG. 25, a continuous surface consisting of a bottom plate 632 which is turned upside when the seat cushion S11 is inverted and of a rear plate 671 of the seat back S12 tilted pivotally forwardly to the space in which the seat cushion S11 has been positioned. Right and left leg members 633 are formed lengthwise on the front end surface (rear end surface in a usage position) of the inverted seat cushion S11. The outer end of each leg member 633 is pivotally connected with a frame (not shown) accommodated inside the seat cushion S11.

Figure 26:
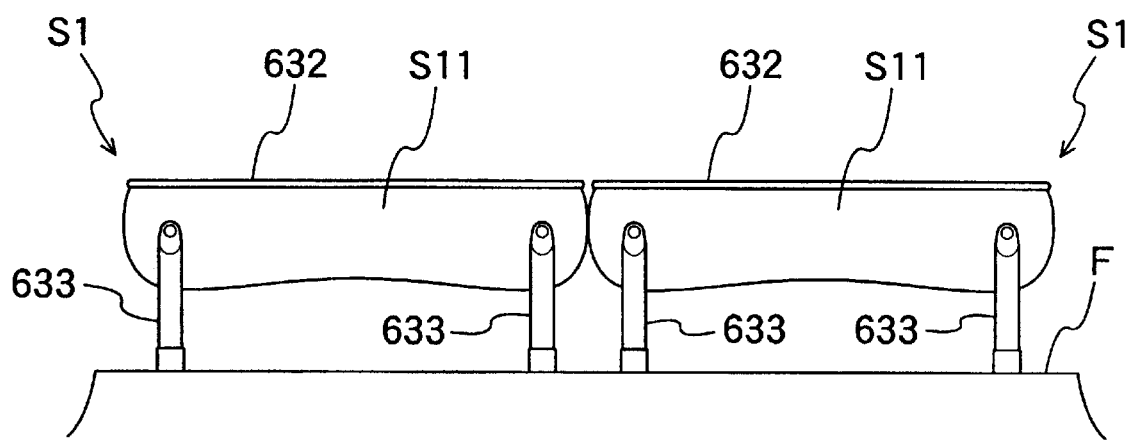
FIG. 26 is a front view showing the rear seat in a full flat state according to the seventh embodiment of the present invention.

When the seat cushion S11 is inverted, each leg member 633 is erected on the floor (F) as shown in FIG. 26 after it is pivoted downward, as shown by the arrow of FIG. 25. Such a construction keeps the height of the front end of the inverted seat cushion S11 constant owing to the constant length of the leg member 633 when it is inverted and reliably prevents the front end thereof from being shifted downward. The construction keeps it horizontal.

Eighth Embodiment

Figure 27:
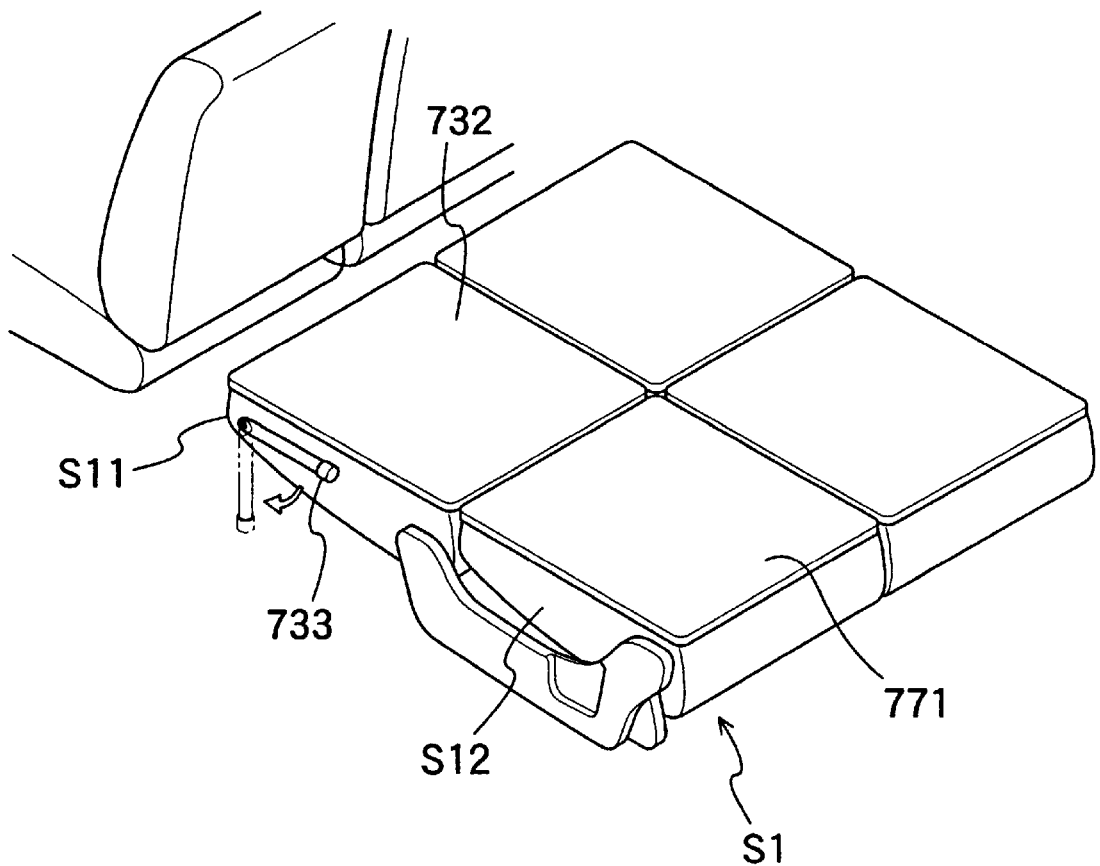
FIG. 27 is a perspective view showing a rear seat in a full flat state according to an eighth preferred embodiment of the present invention.

Similarly to the seventh embodiment, in the eighth embodiment, the seat cushion S11 of the folding seat for a vehicle of the first through sixth embodiments is provided with a supporting member which is positioned at the front end surface of the inverted seat cushion S11. Referring to FIG. 27, a continuous surface is formed consisting of a bottom plate 732 which is turned upside when the seat cushion S11 is inverted and a rear plate 771 of the seat back S12 tilted pivotally forwardly to the space in which the seat cushion S11 has been positioned. A leg member 733 is installed on both side surfaces (one of two is shown) of the seat cushion S11 such that it is positioned thereon in the lengthwise direction thereof. The front end of the leg member 733 is pivotally connected with a frame (not shown) accommodated inside the seat cushion S11.

Figure 28:
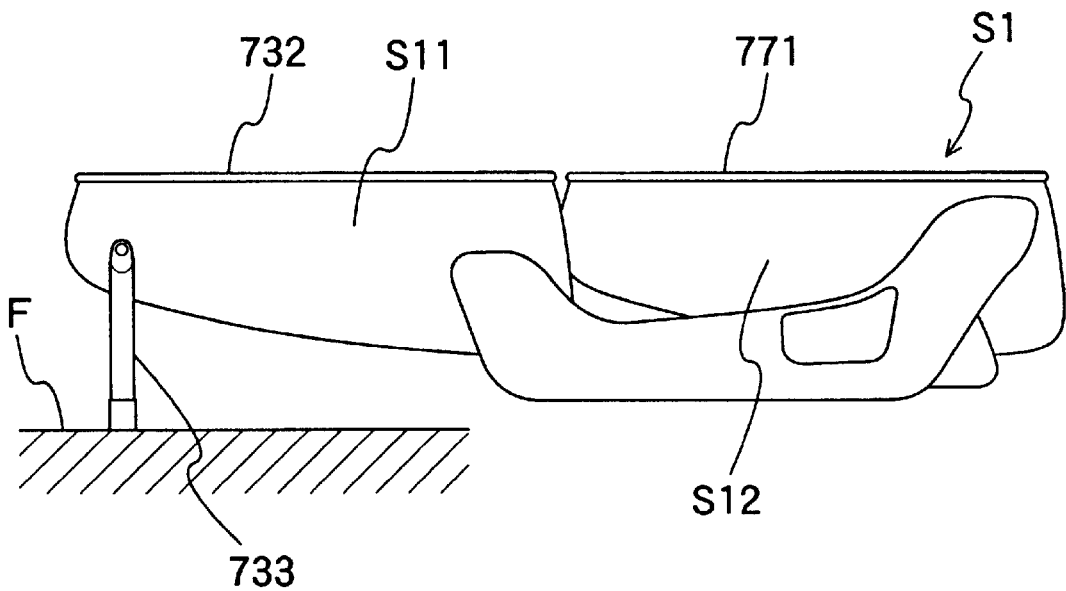
FIG. 28 is a side view showing the rear seat in a full flat state according to the eighth embodiment of the present invention.

When the seat cushion S11 is inverted, the leg member 733 is erected on the floor (F), as shown in FIG. 28, after it is pivoted downward, as shown by the arrow of FIG. 27. Such a construction keeps the height of the front end of the inverted seat cushion constant owing to the leg member 733 having a constant length and reliably prevents the front end thereof from being shifted downward, i.e., keeps it horizontal when a comparatively great load is applied to the seat cushion S11.

Ninth Embodiment

Figure 29:
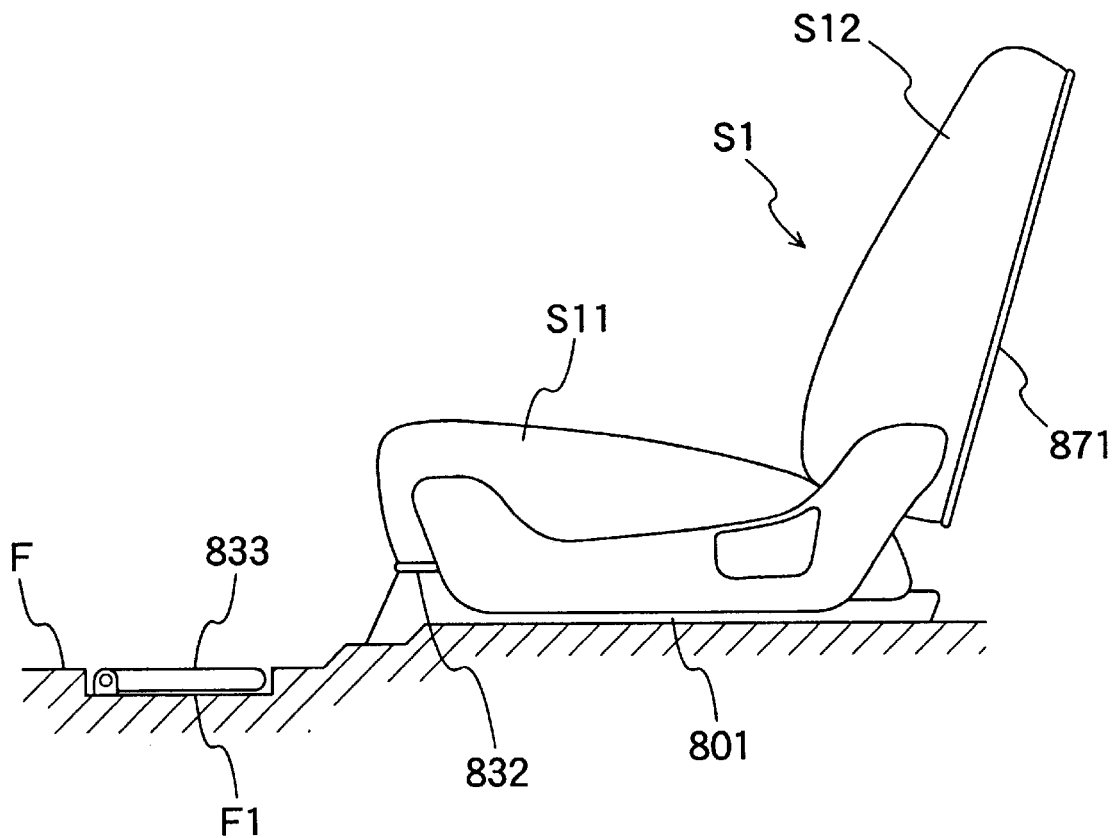
FIG. 29 is a side view showing a rear seat of a ninth preferred embodiment of the present invention in the original position.
Figure 31:
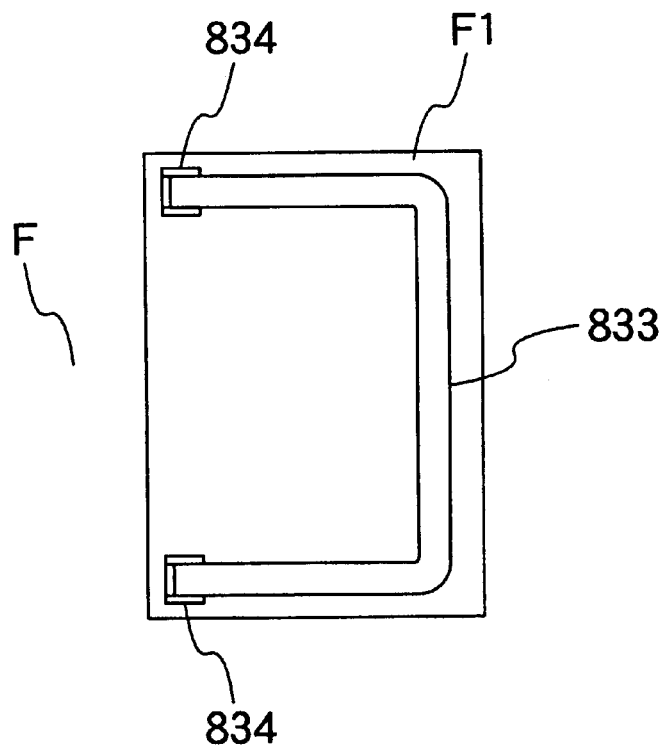
FIG. 31 is a plan view showing a supporting member accommodated in a predetermined part according to the ninth embodiment of the present invention.
Figure 32:
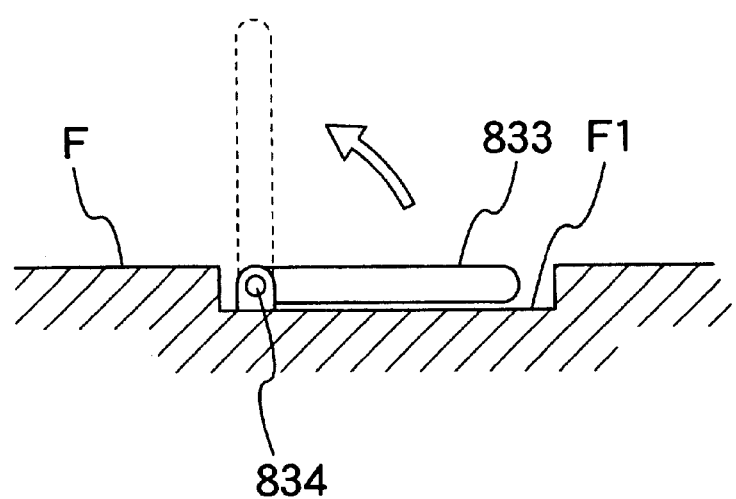
FIG. 32 is a side view showing the supporting member accommodated in the predetermined part according to the ninth embodiment of the present invention.

In the ninth embodiment, the seat cushion S11 of the folding seat for a vehicle of the first through sixth embodiments is provided with a supporting member supporting the front end surface of the inverted seat cushion S11. Referring to FIG. 29, a supporting member 833 is installed in a concave portion F1 formed on the floor (F) such that the concave portion F1 is positioned in front of the rear seat S1 installed on a slide rail 801. As shown in FIG. 31, the supporting member 833 is made of a rod material bent in the shape of a "U" by molding. Both ends of the supporting member 833 are pivotally connected with the bottom surface of the concave portion F1 by means of a bracket 834. More specifically, as shown by the arrow of FIG. 32, the supporting member 833 can be pivotally shifted from a horizontal state to an erected state, as shown by the one-dot chain line of FIG. 32, to support the seat cushion S11.

Figure 30:
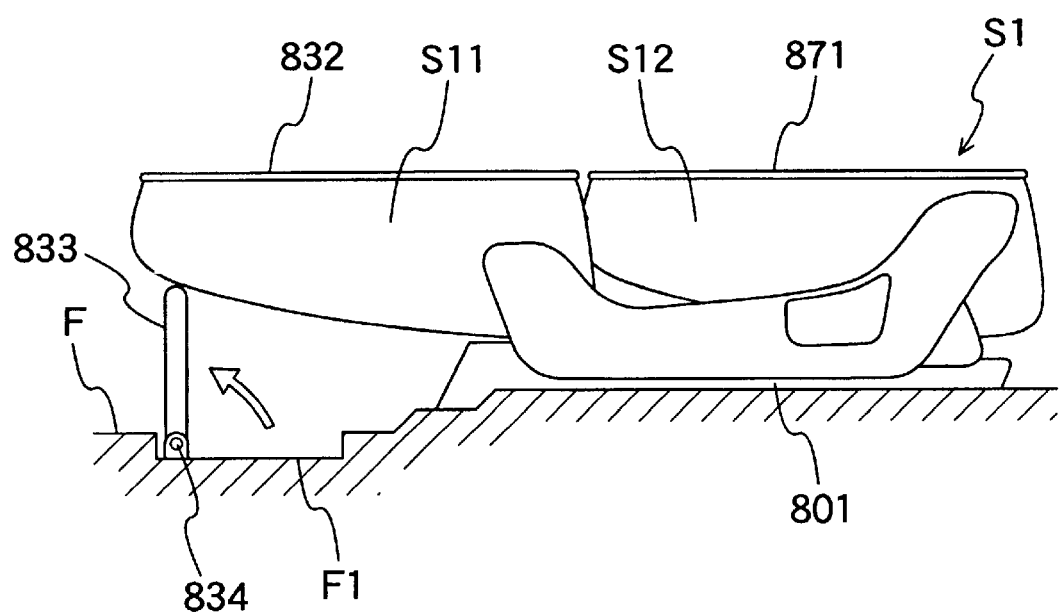
FIG. 30 is a side view showing a rear seat in a full flat state according to the ninth embodiment of the present invention.

When the seat cushion S11 is inverted and seat back S12 is tilted pivotally forwardly to the space in which the seat cushion S11 has been positioned, a bottom plate 832 of the seat cushion S11 and a rear plate 871 of the seat back S12 form a continuous surface, as shown in FIG. 30. Then, the supporting member 833 is pivoted to erect it on the concave portion F1 before inverting the seat cushion S1. Then, the front end of the inverted seat cushion S11 is placed on the supporting member 833, as shown in FIG. 30. The supporting member 833 which is erected on the floor (F) and has an unvaried length keeps the height of the front end of the inverted seat cushion S11 constant. Further, the supporting member 833 reliably prevents the front end thereof from being shifted downward, i.e., keeps it horizontal when a comparatively great load is applied to the seat cushion S11.

Tenth Embodiment

Figure 33:
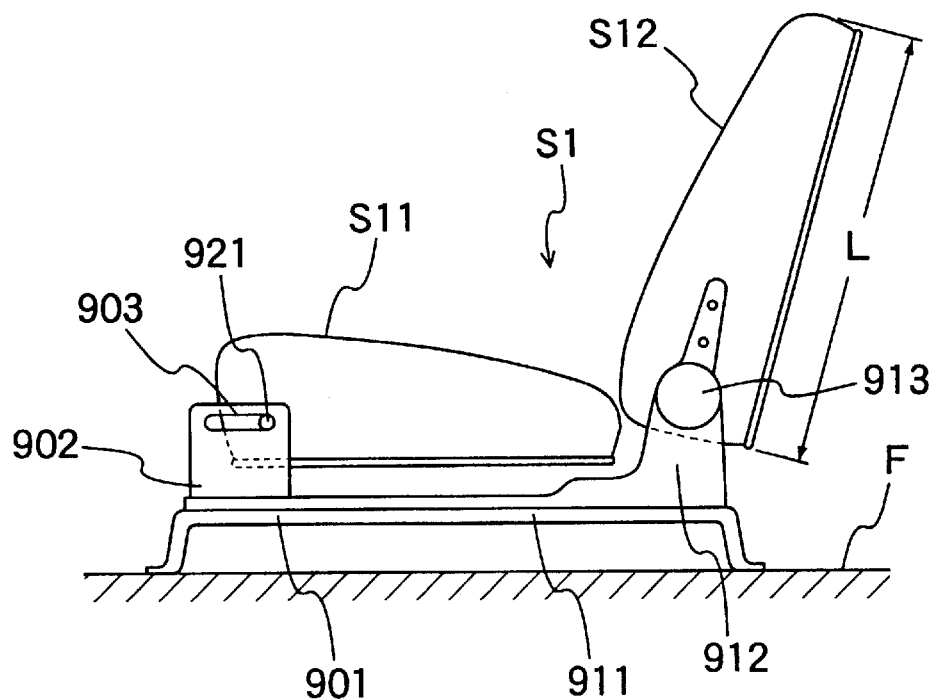
FIG. 33 is a side view showing a rear seat of a tenth preferred embodiment of the present invention in its original position.

Referring to FIG. 33, a pair of slide rails 901 (one of two is shown in FIG. 33) comprises a pair of lower rails 911 and a pair of upper rails 912 sliding along the lower rails 911. A bracket 902 is fixed to the front end of each of the right and left upper rails 912. A slot 903 extending lengthwise (right-to-left direction in FIG. 33) is formed on the upper end of the bracket 902. A shaft member 921 projecting from a side surface of the seat cushion S11 is inserted into the rear end of the slot 903 and supported thereby. As shown in FIG. 33, the seat cushion S11 is horizontally supported by a stopper not shown in FIG. 33.

The seat cushion S11 is pivotally forward on the shaft member 921 and linearly forwardly movable along the shaft member 921. The total length of the seat back S12 connected with the upper rail 912 through a reclining mechanism 913 is L.

Figure 34:
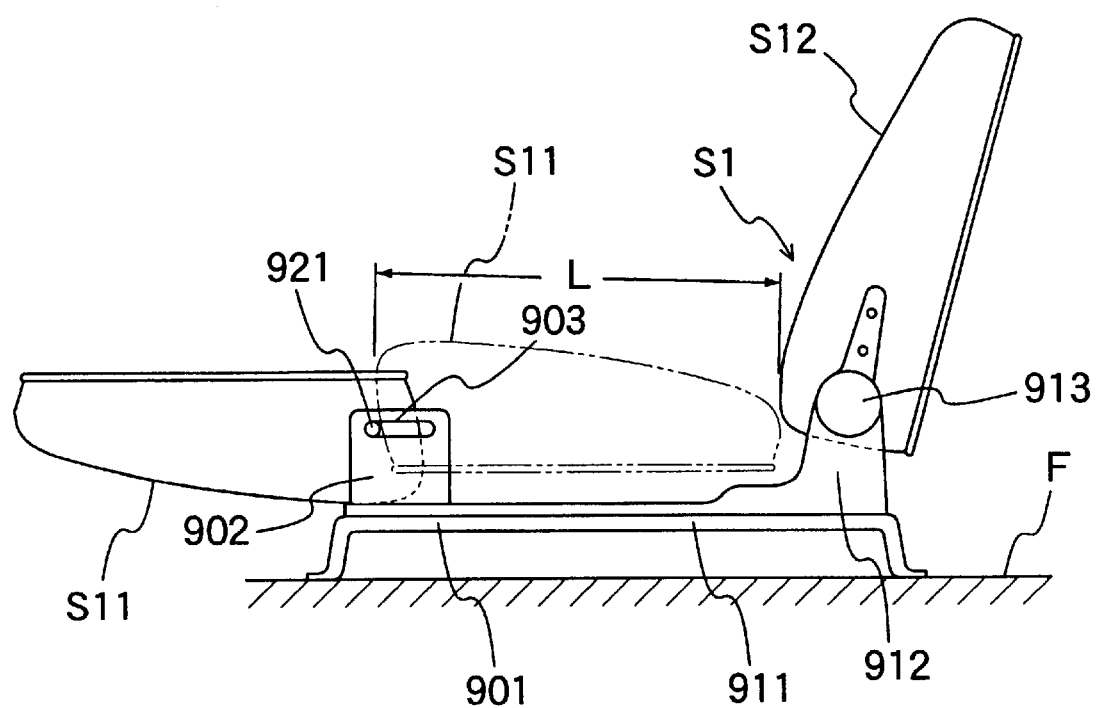
FIG. 34 is a side view showing a rear seat with a inverted seat cushion thereof according to the tenth embodiment of the present invention.

In order to allow the rear seat S1 to be fully flat, the seat cushion S11 is pivoted forward on the shaft member 921 and inverted at a predetermined forward position, and the shaft member 921 is moved to the front end of the slot 903 simultaneously, as shown in FIG. 34. As a result, a space having a length (L) is formed in the space in which the seat cushion S11 has been inverted. Thus, the seat back S12 having the sufficiently great length (L) can be tilted pivotally forwardly to the space. Accordingly, this construction allows the length (L) of the seat back S12 to be comparatively freely set, irrespective of the longitudinal length of the seat cushion S11.

Eleventh Embodiment

Figure 35:
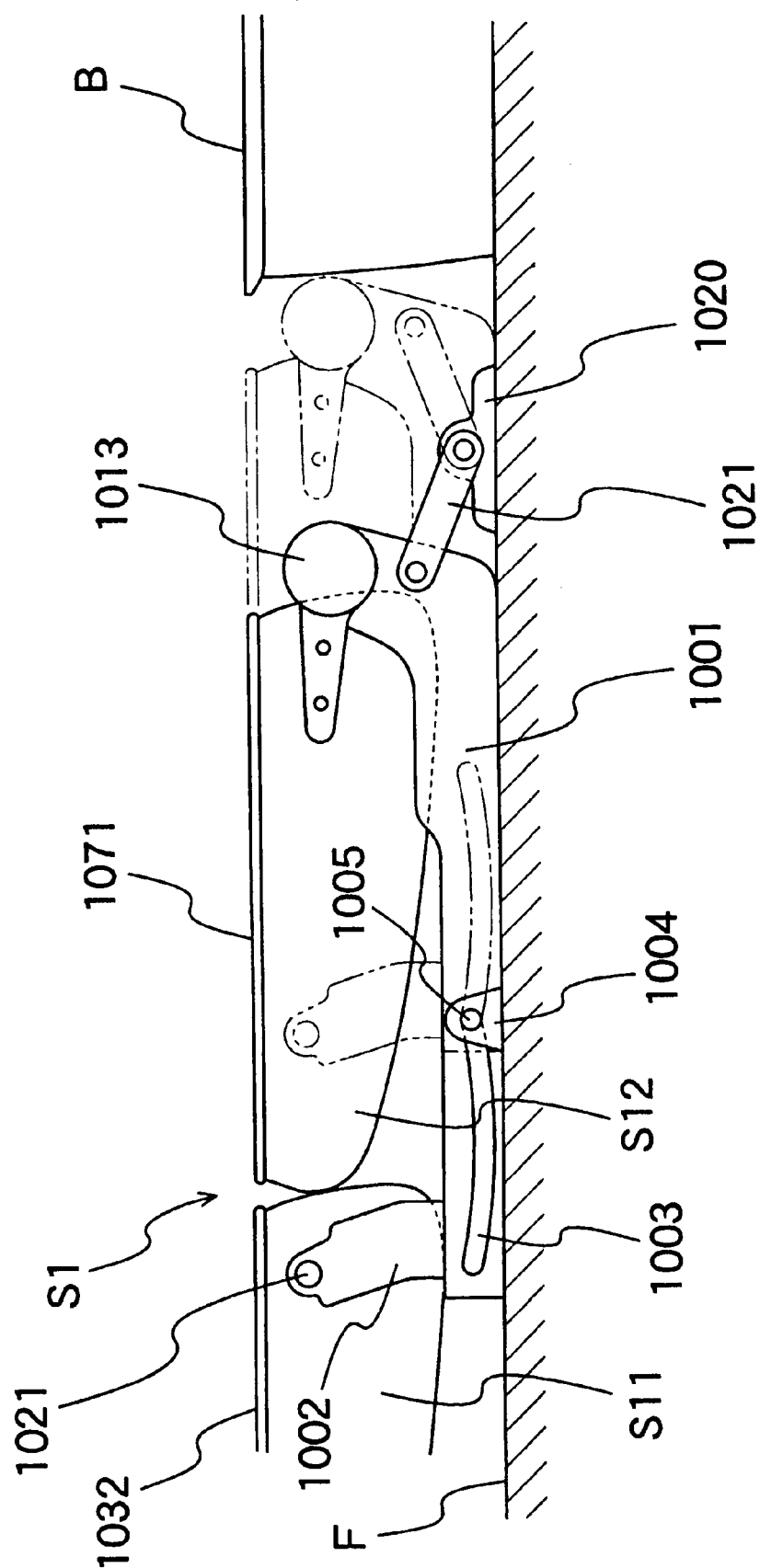
FIG. 35 is a side view showing a rear seat in a full flat state according to an eleventh preferred embodiment of the present invention.

Referring to FIG. 35, a bracket 1002 is installed on the front end of each of the right and left rail frames 1001 (one of two is shown in FIG. 35) extending in parallel with each other on the floor (F) The seat cushion S11 is pivoted forward on the shaft member 1021 to invert it at a predetermined forward position. Thus, a continuous surface is formed consisting of a bottom plate 1032 of the inverted seat cushion S11 and a rear plate 1071 of the seat back S12 tilted pivotally forward to the space in which the seat cushion S11 has been inverted. A circular arc-shaped slot 1003 curved downward is formed on the front end of a side surface of the rail frame 1001. A pin 1005 projecting from a side surface of the bracket 1004 installed on the floor (F) is inserted into the slot 1003 such that the pin 1005 is positioned at the rear end thereof. The seat back S12 is connected with the rear end of the rail frame 1001 through a reclining mechanism 1013. A bracket 1020 is provided on the floor (F) between the rear seat S1 and the luggage box (B). One end of a link arm 1021 is connected with the bracket 1020, and the other end thereof is connected with the rear end of the rail frame 1001.

In such a construction, with the rail frame 1001 being lifted upward, the link arm 1021 is pivoted rearward as shown by the two-dot chain line of FIG. 35 to move rearward the rail frame 1001 and the seat cushion S11 and the seat back S12 both connected with the rail frame 1001. As a result, the seat back S12 approaches the luggage box (B) to form a sufficiently long continuous surface form the upper surface of the laggage box (B), the rear plate 1071 of the seat back S12, and the bottom plate 1032 of the seat cushion S11. Thus, the space in the van can be effectively utilized. When the rail frame 1001 moves rearward, the pin 1005 moves forward in the slot 1003 positioned at the front end of the rail frame 1001 relative to the slot 1003. As a result, when the rear frame 1001 moves rearward, the front end thereof is prevented from being moved upward.

Twelfth Embodiment

In the twelfth embodiment, in the folding seat for a vehicle of the first through eleventh embodiment except the third embodiment is provided with a bridging plate which closes the gap between the rear end of the seat back S12 and the luggage box (B). That is, referring to FIG. 36, the seat cushion S11 is inverted and the seat cushion S12 of the rear seat S1 installed on the slide rail 1101 is tilted pivotally forwardly to the space in which the seat cushion S11 has been positioned. As a result, a bottom plate 1132 of the seat cushion S11 and a rear plate 1171 of the seat back S12 form a continuous surface. A bridging plate 1172 is provided to overlay upon the rear plate 1171 of the seat back S12. The rear end (lower end when the seat back S12 is at the usage position) of the bridging plate 1172 is connected with the rear end of the rear plate 1171 by means of a hinge 1173 such that the bridging plate 1172 is pivotal.

Figure 36:
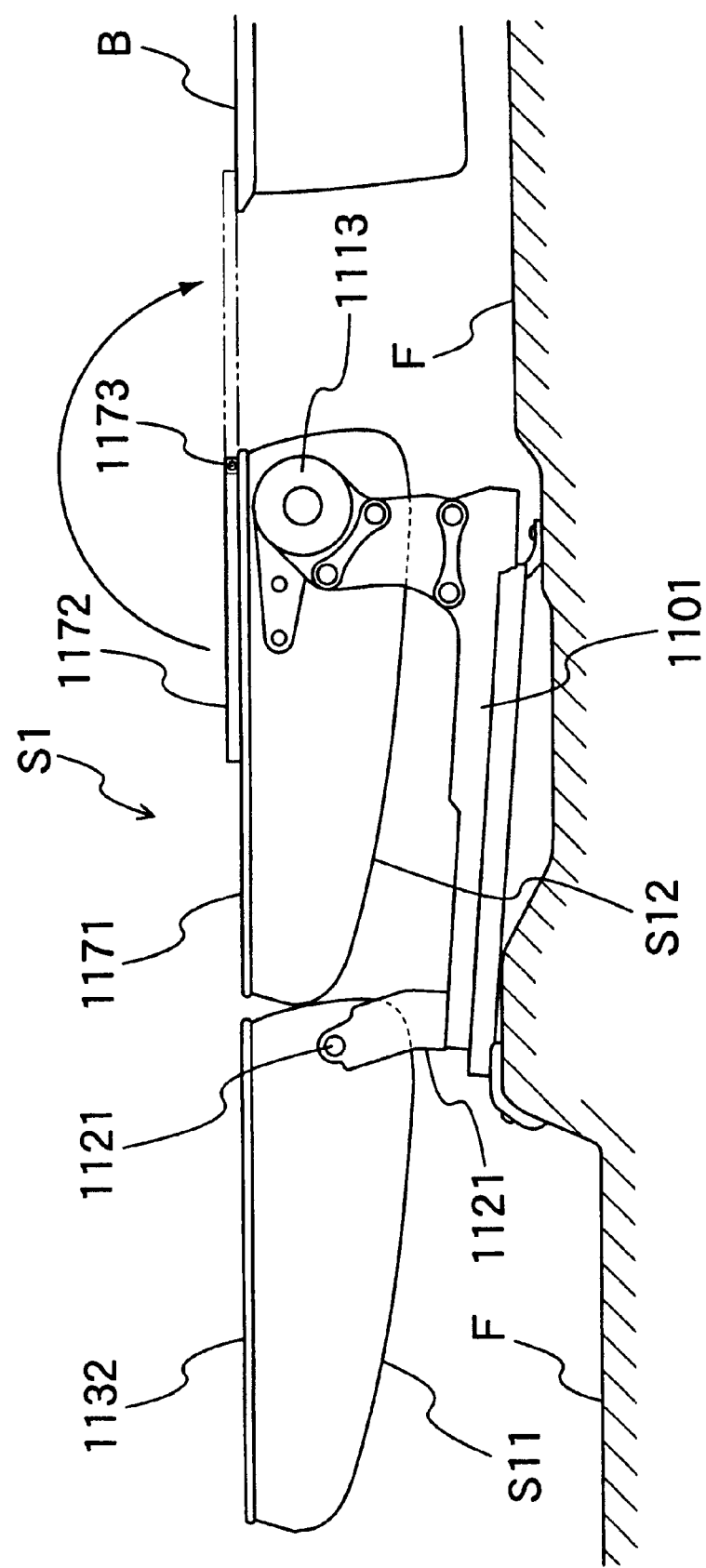
FIG. 36 is a side view showing a rear seat in a full flat state according to a twelfth preferred embodiment of the present invention.

When the rear seat S1 is moved forward along the slide rail 1101, a large gap is formed between the rear seat S1 and the luggage box (B), as shown in FIG. 36. At this time, the bridging plate 1172 is pivoted rearward as shown by the two-dot chain line of FIG. 36 to place the front end thereof on the front end of the luggage box (B). As a result, a sufficiently long continuous surface is formed consisting of the upper surface of the laggage box (B), the bridging plate 1172, the rear plate 1171 and the bottom plate 1132. Thus, the space in the van can be effectively utilized.

Thirteenth Embodiment

Figure 37:
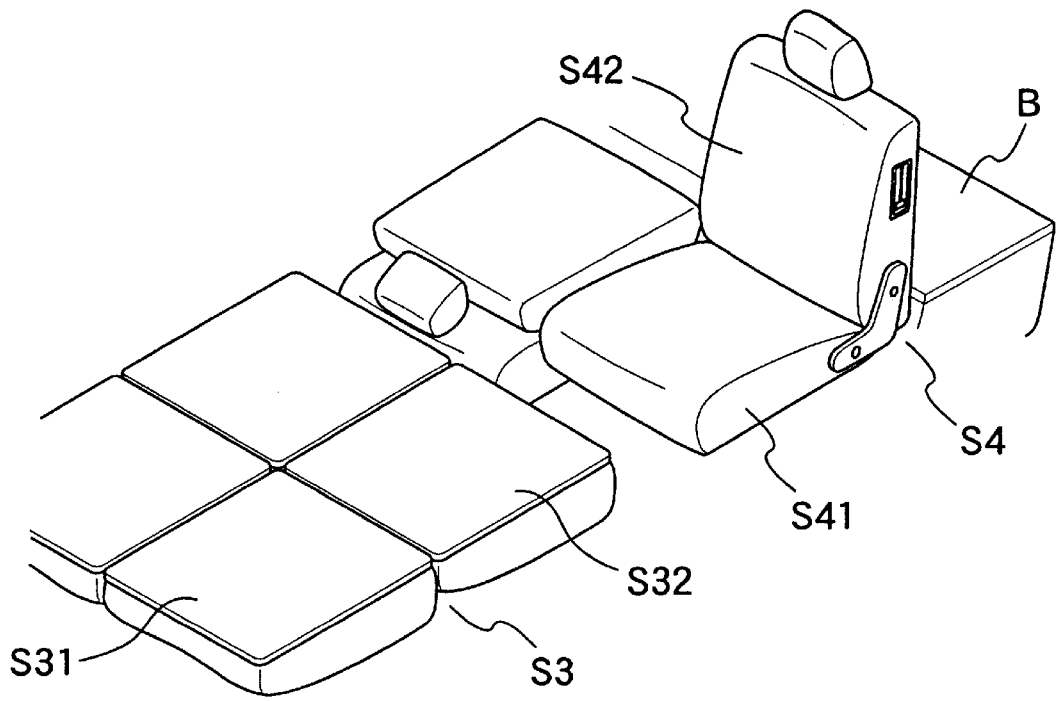
FIG. 37 is a perspective view showing a front-side rear seat in a full flat state and a rear-side rear seat in its original position according to a thirteenth preferred embodiment of the present invention.
Figure 38:
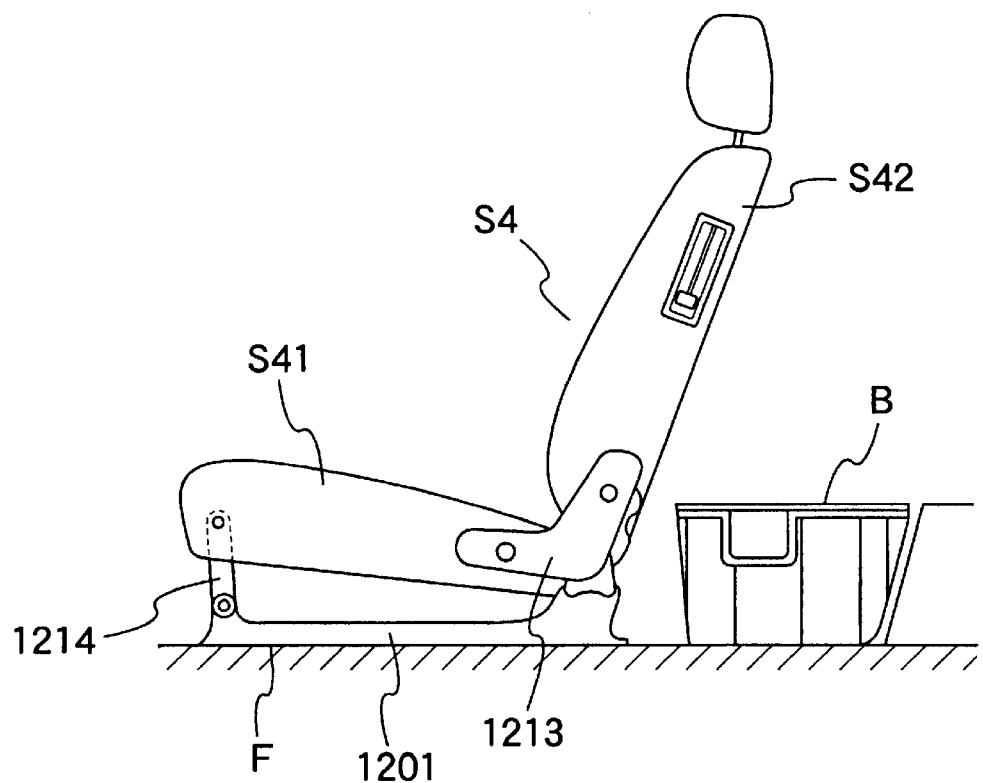
FIG. 38 is a side view showing a rear-side rear seat according to the thirteenth embodiment of the present invention.

Referring to FIG. 37, the full flat type folding seat for a vehicle of each of the first through twelfth embodiments is used as a front-side rear seat S3, and a known tilt down type folding seat for a vehicle is provided as a rear-side rear seat S4 between the front-side rear seat S3 and the luggage box (B). As shown in FIG. 38 indicating the rear-side rear seat S4, the rear end part of a seat cushion S41 and the lower end part of a seat back S42 are connected with each other with an upper link 1213, and the front part of the seat cushion S41 is connected with a rail frame 1201 installed on the floor (F) with a link arm 1214.

Figure 39:
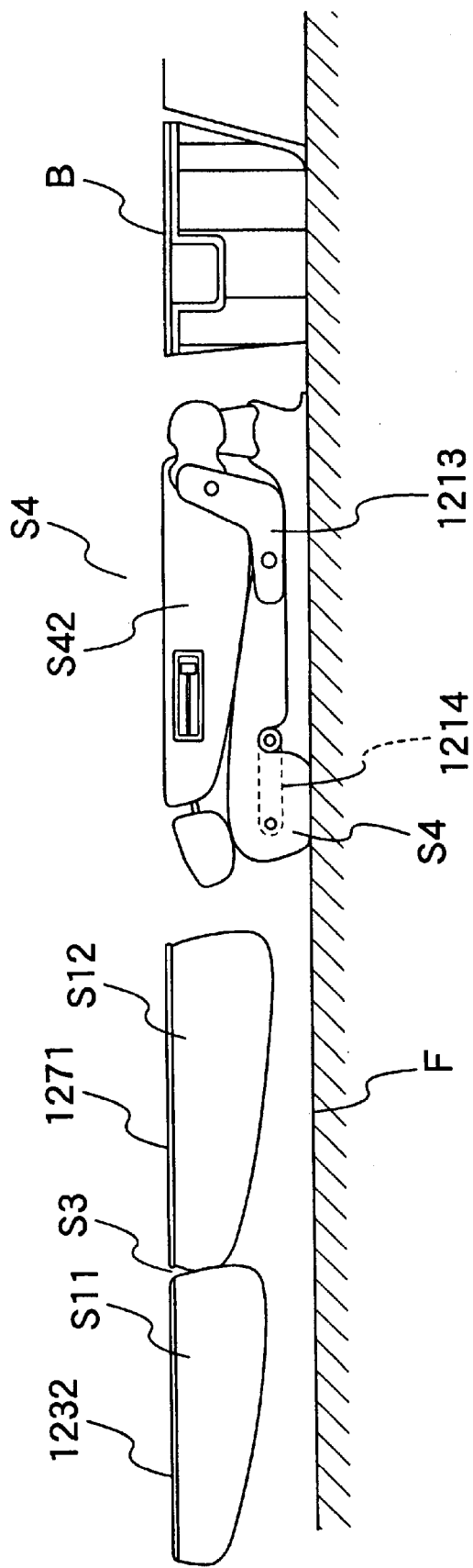
FIG. 39 is a side view showing the front-side rear seat in a full flat state and the rear-side rear seat in a tilt-down state according to the thirteenth embodiment of the present invention.

When the seat back S42 is tilted pivotally forwardly onto the seat cushion S41 by means of a reclining mechanism (not shown), the upper link 1213 moves forwardly downwardly and the link arm 1214 pivots forward, as shown in FIG. 39. As a result, the seat cushion S41 and the seat back S42 overlaid thereon move downward toward the floor (F). Consequently, there is formed a sufficiently long continuous surface consisting of the bottom plate 1232 of the front-side rear seat S3, a rear plate 1271 thereof, the rear surface of the rear-side seat back S42, and upper surface of the luggage box (B)

What is claimed is:

1. A folding seat for a vehicle, said seat comprising:
   a movable member adapted to be mounted on a floor of a vehicle such that said movable member is movable lengthwise over said floor;
   a seat cushion, on said movable member, whose front end is connected with one end of said movable member by a shaft member such that said seat cushion is pivotable on said shaft member to invert said seat cushion at a predetermined forward position; and
   a seat back whose lower end is pivotally connected with the other end of said movable member and which is pivotally tiltable forward to a space from which said seat cushion has been pivoted for inversion, wherein a baggage-placing surface having approximately a uniform height and having a bottom surface of said inverted seat cushion and a rear surface of said seat back tilted pivotally forwardly is formed, wherein said shaft member is supported by a bracket provided on said movable member, and said bracket has a stopper to position said seat cushion such that a bottom surface of said seat cushion forms a baggage-placing surface by contact of a part of said seat cushion with said stopper when said seat cushion is pivoted for inversion.

2. A folding seat for a vehicle according to claim 1, wherein said stopper is a cylindrical member on said bracket and extending vertically, and an upper end surface of said cylindrical member serves as a stopper surface for contacting a part of said seat cushion.

3. A folding seat for a vehicle according to claim 1, wherein said stopper is provided on said bracket such that a vertical position of said stopper is adjustable.

4. A folding seat for a vehicle according to claim 6, wherein said stopper is constructed of a stopper member having a female screwing portion and a bolt screwed into said female screwing portion and having a stopper surface formed on a head portion thereof.

5. A folding seat for a vehicle according to claim 1, wherein said movable member is an upper rail sliding on a lower rail which is adapted to be mounted on said floor.

6. A folding seat for a vehicle according to claim 5, wherein a vertical position of a bracket rotatably supporting a front end portion of said seat cushion is adjustable within a predetermined range before said seat cushion is placed in position.

7. A folding seat for a vehicle according to claim 6, further comprising a supporting member for supporting a front end of said inverted seat cushion.

8. A folding seat for a vehicle according to claim 6, wherein said shaft member is movable lengthwise along said movable member within a predetermined range.

9. A folding seat for a vehicle according to claim 8, wherein said shaft member is positioned in a slot formed on a bracket on said movable member and extending lengthwise.

10. A folding seat for a vehicle according to claim 6, wherein a bridging plate whose lower end is pivotally connected with a rear surface of said seat back is provided on said rear surface such that said bridging plate is pivoted rearward when said seat back-is tilted pivotally forwardly, wherein said bridging plate is adapted to be placed on a front edge of a stepped rear half part of said floor as high as said baggage-placing surface.

11. A folding seat for a vehicle according to claim 1, wherein an extended portion is formed by extending a part of said rear surface of said seat back in a seat back-extended direction by a predetermined length from a lower edge of said seat back such that when said seat back is pivotally forwardly tilted, said extended portion is adapted to extend to a front edge of a stepped rear half part of said floor as high as said baggage-placing surface, thus contacting said front edge and filling a gap between said front edge and said lower edge of said seat back.

12. A folding seat for a vehicle according to claim 6, wherein a baggage-accommodating tray covering said movable member is in a space below said uninverted seat cushion.

13. A seat system for a vehicle in which a tilt-down seat is positioned adjacently o a folding seat for a vehicle according to claim 1 and is adapted to move downward to a floor in association with a forward pivotal motion of a seat back thereof to form a baggage-placing surface having approximately a uniform height and having a bottom surface of an inverted seat cushion of said folding seat for a vehicle, a rear surface of a seat back of said folding seat for a vehicle tilted pivotally forwardly and a rear surface of said seat back of said tilt-down seat tilted pivotally forwardly.

* * * * *